(12) United States Patent
Xiao et al.

(10) Patent No.: US 8,866,871 B2
(45) Date of Patent: Oct. 21, 2014

(54) IMAGE PROCESSING METHOD AND IMAGE PROCESSING DEVICE

(71) Applicant: Huawei Technologies Co., Ltd., Guangdong (CN)

(72) Inventors: Jing Xiao, Shenzhen (CN); Jing Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/196,877

(22) Filed: Mar. 4, 2014

(65) Prior Publication Data

US 2014/0184727 A1   Jul. 3, 2014

Related U.S. Application Data

(63) Continuation of application No. PCT/CN2012/081207, filed on Sep. 10, 2012.

(51) Int. Cl.
*H04N 7/14* (2006.01)
*H04N 7/15* (2006.01)
*H04N 5/262* (2006.01)

(52) U.S. Cl.
CPC . *H04N 7/15* (2013.01); *H04N 5/262* (2013.01)
USPC ........ 348/14.07; 345/619; 345/643; 345/660; 345/1.3; 345/33

(58) Field of Classification Search
CPC .................................................. H04N 5/262
USPC .......................................... 348/14.01–14.16
See application file for complete search history.

(56) References Cited

U.S. PATENT DOCUMENTS 7,515,174 B1 *   4/2009   Francisco et al. .......... 348/14.16
8,270,767 B2 *   9/2012   Park .............................. 382/284

(Continued)

FOREIGN PATENT DOCUMENTS

| CN | 101511008 A | 8/2009 |
|----|-------------|--------|
| CN | 102025891 A | 4/2011 |
| CN | 102427504 A | 4/2012 |
| CN | 103096018 A | 5/2013 |

OTHER PUBLICATIONS

"H.TPS-AV 'Audio/Video Parameters for Telepresence systems' (New): Output Draft (Ed. 0.7)," Study Group 16, TD 768R1 (WP 2/16), Geneva, Switzerland, International Telecommunication Union (May 2012).

*Primary Examiner* — Hemant Patel
(74) *Attorney, Agent, or Firm* — Leydig, Voit & Mayer, Ltd.

(57) ABSTRACT

An image processing method and an image processing device are provided. The image processing method includes: determining a first width and a second width, where the second width is the width of a gap between display devices of target images on N screens, the first width is the width of a blind spot between source images corresponding to the N screens, N is an integer greater than 1, and the N screens are of a same size and are arranged side by side at a same height; and when the first width is different from the second width, adjusting the source images according to the determined first width and second width so as to obtain the target images, so that no mismatch exists in the stitched target images on the N screens.

30 Claims, 9 Drawing Sheets

(56) References Cited

U.S. PATENT DOCUMENTS

| | | | |
|---|---|---|---|
| 2006/0244817 A1* | 11/2006 | Harville et al. | 348/14.08 |
| 2007/0279483 A1* | 12/2007 | Beers et al. | 348/14.08 |
| 2009/0237560 A1* | 9/2009 | Ganzaroli et al. | 348/511 |
| 2010/0238090 A1* | 9/2010 | Pomerantz et al. | 345/1.3 |
| 2011/0164065 A1* | 7/2011 | Mate et al. | 345/676 |
| 2012/0169833 A1* | 7/2012 | Wu et al. | 348/14.08 |
| 2012/0314015 A1* | 12/2012 | Watson et al. | 348/14.1 |

* cited by examiner

IMAGE PROCESSING METHOD AND IMAGE PROCESSING DEVICE

CROSS-REFERENCE TO RELATED APPLICATIONS

This application is a continuation of International Patent Application No. PCT/CN2012/081207, filed on Sep. 10, 2012, which is hereby incorporated by reference in its entirety.

TECHNICAL FIELD

Embodiments of the present invention relate to the field of video conferencing, and in particular, to an image processing method and an image processing device.

BACKGROUND

As coding and information compression technologies develop and digital networks rocket, videoconferencing systems start to step into the market. When IP (Internet Protocol, Internet Protocol) network technologies move toward maturity, IP networks become an important network platform for global communications. The ITU-T (International Telecommunication Union-Telecommunication Standardization Sector, International Telecommunication Union-Telecommunication Standardization Sector) puts forward the H.323 videoconferencing standard based on IP networks. This swerves the research and application direction of a videoconferencing system to development based on IP networks.

Today, a videoconferencing system based on the H.323 videoconferencing standard is finding increasingly wide use with the rapid development of IP networks. Most of departments, such as the government, the army, and enterprises, have deployed their own videoconferencing system to improve meeting efficiency and save meeting costs.

Telepresence (Telepresence), a new technology, emerges in the videoconferencing market. Remote participants are at another end of a network, but their images are displayed in true-to-life dimensions on a display device in a conference room, and a user does not feel any discomfort or difference. A perfect combination of a video image in true-to-life dimensions, a high-definition image effect, an audio system with a sense of space, and the environment creates a sense of being in the same conference room with the remote participants. A complete set of a telepresence system needs to consist of an appropriate conference room, power, a high-bandwidth network channel, an independent wall, a desk, a chair, a light, a video display device, a control device, and an audio device. Compared with a conventional conferencing system, a telepresence system has its unique advantages, that is, it not only saves travel expenses but also significantly improves conference quality. In addition, telepresence overcomes the plane and unreal effects of a conventional video conference and makes a conference more natural, thereby improving conference efficiency.

In the telepresence technology, each camera at a local conference site corresponds to a different user area, and each camera simultaneously captures an image of a corresponding user area and sends it to a conferencing terminal at a remote conference site; the conferencing terminal at the remote conference site stitches, by using a physical or digital image stitching technology, images captured by cameras at the local conference site, and then outputs them to adjacent display devices at the remote conference site for displaying; and a conferencing terminal at the local conference site may also stitch, by using a physical or digital image stitching technology, images captured by cameras at the remote conference site, and then outputs them to adjacent display devices at the local conference site for displaying. For the purpose of implementing image stitching without a mismatch, a certain fixed model of display devices are generally selected at the local conference site and the remote conference site, or at least frames of the display devices are the same.

In the prior art, image stitching without a mismatch requires that the width of a blind spot between two adjacent images equal the minimum edge gap between displayable areas of two adjacent display devices. The minimum edge gap may also be called the width of a gap between display devices. If the displayable areas of the display devices occupy the entire screens of the display devices, the width of a gap between the display devices basically equals the sum of the width of frames of the two adjacent display devices. Such stitching without a mismatch will not make a user feel that an image is mismatched, thereby better satisfying a reality requirement of the telepresence technology. Here, the blind spot is a conference scenario area that is not covered by the adjacent images. If the adjacent images are images shot by adjacent cameras, the blind spot is specifically a conference scenario area that is beyond shooting areas of the adjacent cameras. A displayable area is the largest display area that hardware of a display device can support, and the area is generally rectangular.

For the purpose of implementing image stitching without a mismatch, it is required that the width of a blind spot between adjacent images equal the width of a gap between adjacent display devices that are used to display the adjacent images at a target end. However, as display devices are continually replaced by new ones, screen dimensions and frame sizes of the display devices change accordingly. If the width of a gap between display devices at a target end is inconsistent with the width of a blind spot between the adjacent images, this may lead to a mismatch in image stitching at the target end, thereby affecting user experience.

SUMMARY

Embodiments of the present invention provide an image processing method and an image processing device, so as to improve a sense of reality of telepresence.

In a first aspect, an image processing method is provided, including: determining a first width and a second width, where the second width is the width of a gap between display devices of target images on N screens, the first width is the width of a blind spot between source images corresponding to the N screens, N is an integer greater than 1, and the N screens are of a same size and are arranged side by side at a same height; and when the first width is different from the second width, adjusting the source images according to the determined first width and second width so as to obtain the target images, so that no mismatch exists in the stitched target images on the N screens.

With reference to the first aspect, in an implementation manner of the first aspect, the adjusting the source images so as to obtain the target images, so that no mismatch exists in the stitched target images on the N screens includes: pruning and padding a source image corresponding to one or more screens among the N screens so as to obtain a corresponding target image, so that no mismatch exists in the stitched target images on the N screens; or zooming out and padding a source image corresponding to one or more screens among the N screens so as to obtain a corresponding target image, so that no mismatch exists in the stitched target images on the N screens; or zooming in and pruning a source image corresponding to one or more screens among the N screens so as to obtain a corresponding target image, so that no mismatch exists in the stitched target images on the N screens.

With reference to the first aspect and the preceding implementation manner, in another implementation manner of the first aspect, the pruning and padding a source image corresponding to one or more screens among the N screens so as to obtain a corresponding target image, so that no mismatch exists in the stitched target images on the N screens includes: calculating a part that needs to be pruned from the source image, determining, in a color array of the source image, a pixel area corresponding to the part that needs to be pruned, and discarding pixel data in the pixel area; and calculating a part that needs to be padded, determining, in the color array of the source image, a position of a pixel area corresponding to the part that needs to be padded, and adding pixel data of a preset color into the pixel area corresponding to the position of the pixel area, so as to obtain the target image corresponding to the source image, so that no mismatch exists in the stitched target images on the N screens.

With reference to the first aspect and the preceding implementation manners, in another implementation manner of the first aspect, the zooming out and padding a source image corresponding to one or more screens among the N screens so as to obtain a corresponding target image, so that no mismatch exists in the stitched target images on the N screens includes: calculating a zoom factor according to the first width and the second width; and when the first width is greater than the second width, compressing all pixels in a color array of the source image according to the zoom factor, calculating a part that needs to be padded, determining, in the color array of the source image, a position of a pixel area corresponding to the part that needs to be padded, and adding pixel data of a preset color into the pixel area corresponding to the position of the pixel area, thereby obtaining the target image corresponding to the source image and avoiding a mismatch in the stitched target images on the N screens.

With reference to the first aspect and the preceding implementation manners, in another implementation manner of the first aspect, the zooming in and pruning a source image corresponding to one or more screens among the N screens so as to obtain a corresponding target image, so that no mismatch exists in the stitched target images on the N screens includes: calculating a zoom factor according to the first width and the second width; and when the first width is less than the second width, stretching all pixels in a color array of the source image according to the zoom factor, calculating a part that needs to be pruned from the source image, determining, in the color array of the source image, a pixel area corresponding to the part that needs to be pruned, and discarding pixel data in the pixel area, thereby obtaining the target image corresponding to the source image and avoiding a mismatch in the stitched target images on the N screens.

With reference to the first aspect and the preceding implementation manners, in another implementation manner of the first aspect, the pruning and padding a source image corresponding to one or more screens among the N screens so as to obtain a corresponding target image, so that no mismatch exists in the stitched target images on the N screens includes: taking a source image corresponding to a first screen among the N screens as a target image on the first screen, or pruning and padding a source image corresponding to a first screen as a target image on the first screen; and pruning and padding a source image corresponding to an adjacent screen of the first screen as a target image on the adjacent screen, so that no mismatch exists in the stitched target images on the N screens.

With reference to the first aspect and the preceding implementation manners, in another implementation manner of the first aspect, the pruning and padding a source image corresponding to an adjacent screen of the first screen as a target image on the adjacent screen includes: when the first width is greater than the second width, pruning a part that has a width of c from a side that is in the source image corresponding to the adjacent screen and is away from the first screen, and padding an edge that is in the preset color and has a width of c into a side that is in the source image corresponding to the adjacent screen and is near the first screen, so as to obtain the target image on the adjacent screen, where $c=a-b$, a is the first width, and b is the second width.

With reference to the first aspect and the preceding implementation manners, in another implementation manner of the first aspect, the pruning and padding a source image corresponding to an adjacent screen of the first screen as a target image on the adjacent screen includes: when the first width is less than the second width, pruning a part that has a width of c from a side that is in the source image corresponding to the adjacent screen and is near the first screen, and padding an edge that is in the preset color and has a width of c into a side that is in the source image corresponding to the adjacent screen and is away from the first screen, so as to obtain the target image on the adjacent screen, where $c=b-a$, a is the first width, and b is the second width.

With reference to the first aspect and the preceding implementation manners, in another implementation manner of the first aspect, the pruning a source image corresponding to a first screen as a target image on the first screen includes: pruning an edge that has a width of f from two sides of the source image corresponding to the first screen, and separately padding an edge that is in the preset color and has a width of f into the two sides of the source image corresponding to the first screen, where $f<=|a-b|$.

With reference to the first aspect and the preceding implementation manners, in another implementation manner of the first aspect, $f=|a-b|/2$ or $f=|a-b|$, a is the first width, and b is the second width.

With reference to the first aspect and the preceding implementation manners, in another implementation manner of the first aspect, the zooming out and padding a source image corresponding to one or more screens among the N screens so as to obtain a corresponding target image, so that no mismatch exists in the stitched target images on the N screens includes: when the first width is greater than the second width, zooming out the source image according to a zoom factor k, where $k=(b+d)/(a+d)$, a is the first width, b is the second width, and d is the width of the source image; and padding an edge in the preset color around the source image after zooming out, so as to obtain the target image.

With reference to the first aspect and the preceding implementation manners, in another implementation manner of the first aspect, the zooming in and pruning a source image corresponding to one or more screens among the N screens so as to obtain a corresponding target image, so that no mismatch exists in the stitched target images on the N screens includes: when the first width is less than the second width, zooming in the source image according to a zoom factor k, where $k=(b+d)/(a+d)$, a is the first width, b is the second width, and d is the width of the source image; and pruning an edge part from the source image after zooming in, so as to obtain the target image.

With reference to the first aspect and the preceding implementation manners, in another implementation manner of the first aspect, the preset color is a frame color of a display device of the target image.

With reference to the first aspect and the preceding implementation manners, in another implementation manner of the first aspect, the method further includes: preprocessing original images corresponding to the N screens so as to obtain source images that correspond to the N screens and have same dimensions as the target images, where dimensions of the original images are the same as or different from dimensions of the target images.

With reference to the first aspect and the preceding implementation manners, in another implementation manner of the first aspect, the preprocessing original images corresponding to the N screens so as to obtain source images that correspond to the N screens and have same dimensions as the target images includes: if the dimensions of the original images are the same as the dimensions of the target images, taking the original images as the source images; and if the dimensions of the original images are different from the dimensions of the target images, separately zooming in or out, pruning, and/or padding the original images corresponding to the N screens so as to obtain corresponding source images.

With reference to the first aspect and the preceding implementation manners, in another implementation manner of the first aspect, the if the dimensions of the original images are different from the dimensions of the target images, separately zooming in or out, pruning, and/or padding the original images corresponding to the N screens so as to obtain corresponding source images includes: if aspect ratios of the original images are the same as aspect ratios of the target images and the width w of the original images is different from the width d of the target images, proportionally zooming in or out, according to a zoom factor m, the original images corresponding to the N screens so as to obtain the corresponding source images, where $m=d/w$.

With reference to the first aspect and the preceding implementation manners, in another implementation manner of the first aspect, the determining a first width includes: determining that the first width $a=n\times A$, where $n=m$, and A is the width of a blind spot between the original images corresponding to the N screens.

With reference to the first aspect and the preceding implementation manners, in another implementation manner of the first aspect, the if the dimensions of the original images are different from the dimensions of the target images, separately zooming in or out, pruning, and/or padding the original images corresponding to the N screens so as to obtain corresponding source images includes: if aspect ratios of the original images are different from aspect ratios of the target images, proportionally zooming in or out, according to a zoom factor m1, the original images corresponding to the N screens so as to obtain the corresponding intermediate images, where $m1=e/h$, e is the height of the target images, and h is the height of the original images; and pruning or padding an edge that has a total width of $|d-(ew/h)|$ from or into one or two sides of the intermediate images corresponding to the N screens, so as to obtain the corresponding source images, where d is the width of the target images, w is the width of the original images, and $\|$ is a calculation of taking an absolute value.

With reference to the first aspect and the preceding implementation manners, in another implementation manner of the first aspect, the determining a first width includes: determining that the first width $a=n\times A$, where $n=(2Ae+ew-dh)/2Ah$, and A is the width of a blind spot between the original images corresponding to the N screens.

In a second aspect, an image processing device is provided, including: a determining unit, configured to determine a first width and a second width, where the second width is the width of a gap between display devices of target images on N screens, the first width is the width of a blind spot between source images corresponding to the N screens, N is an integer greater than 1, and the N screens are of a same size and are arranged side by side at a same height; and an adjusting unit, configured to adjust, when the first width is different from the second width, the source images according to the first width and the second width that are determined by the determining unit, so as to obtain the target images, so that no mismatch exists in the stitched target images on the N screens.

With reference to the second aspect, in an implementation manner of the second aspect, the adjusting unit is specifically configured to: prune and pad a source image corresponding to one or more screens among the N screens so as to obtain a corresponding target image, so that no mismatch exists in the stitched target images on the N screens; or zoom out and pad a source image corresponding to one or more screens among the N screens so as to obtain a corresponding target image, so that no mismatch exists in the stitched target images on the N screens; or zoom in and prune a source image corresponding to one or more screens among the N screens so as to obtain a corresponding target image, so that no mismatch exists in the stitched target images on the N screens.

With reference to the second aspect and the preceding implementation manner, in another implementation manner of the second aspect, the adjusting unit is specifically configured to: calculate a part that needs to be pruned from the source image, determine, in a color array of the source image, a pixel area corresponding to the part that needs to be pruned, and discard pixel data in the pixel area; and calculate a part that needs to be padded, determine, in the color array of the source image, a position of a pixel area corresponding to the part that needs to be padded, and add pixel data of a preset color into the pixel area corresponding to the position of the pixel area, thereby obtaining the target image corresponding to the source image and avoiding a mismatch in the stitched target images on the N screens; or, the adjusting unit is specifically configured to: calculate a zoom factor according to the first width and the second width; and when the zoom factor is less than 1, compress all pixels in a color array of the source image according to the zoom factor, calculate a part that needs to be padded, determine, in the color array of the source image, a position of a pixel area corresponding to the part that needs to be padded, and add pixel data of a preset color into the pixel area corresponding to the position of the pixel area, thereby obtaining the target image corresponding to the source image and avoiding a mismatch in the stitched target images on the N screens; or, the adjusting unit is specifically configured to: calculate a zoom factor according to the first width and the second width; and when the zoom factor is greater than 1, stretch all pixels in a color array of the source image according to the zoom factor, calculate a part that needs to be pruned from the source image, determine, in the color array of the source image, a pixel area corresponding to the part that needs to be pruned, and discard pixel data in the pixel area, thereby obtaining the target image corresponding to the source image and avoiding a mismatch in the stitched target images on the N screens.

With reference to the second aspect and the preceding implementation manners, in another implementation manner of the second aspect, the adjusting unit is specifically configured to take a source image corresponding to a first screen among the N screens as a target image on the first screen, or prune and pad a source image corresponding to a first screen as a target image on the first screen; and prune and pad a source image corresponding to an adjacent screen of the first screen as a target image on the adjacent screen, so that no mismatch exists in the stitched target images on the N screens.

With reference to the second aspect and the preceding implementation manners, in another implementation manner of the second aspect, the adjusting unit is specifically configured to: when the first width is greater than the second width, prune a part that has a width of c from a side that is in the source image corresponding to the adjacent screen and is away from the first screen, and pad an edge that is in the preset color and has a width of c into a side that is in the source image corresponding to the adjacent screen and is near the first screen, so as to obtain the target image on the adjacent screen, where c=a−b, a is the first width, and b is the second width; or the adjusting unit is specifically configured to: when the first width is less than the second width, prune a part that has a width of c from a side that is in the source image corresponding to the adjacent screen and is near the first screen, and pad an edge that is in the preset color and has a width of c into a side that is in the source image corresponding to the adjacent screen and is away from the first screen, so as to obtain the target image on the adjacent screen, where c=b−a, a is the first width, and b is the second width; or the adjusting unit is specifically configured to prune an edge that has a width of f from two sides of the source image corresponding to the first screen, and separately pad an edge that is in the preset color and has a width of f into the two sides of the source image corresponding to the first screen, where f<=|a−b|.

With reference to the second aspect and the preceding implementation manners, in another implementation manner of the second aspect, the adjusting unit is specifically configured to: when the first width is greater than the second width, zoom out the source image according to a zoom factor k, where k=(b+d)/(a+d), a is the first width, b is the second width, and d is the width of the source image, and pad an edge in the preset color around the source image after zooming out, so as to obtain the target image; or, the adjusting unit is specifically configured to: when the first width is less than the second width, zoom in the source image according to a zoom factor k, where k=(b+d)/(a+d), a is the first width, b is the second width, and d is the width of the source image, and prune an edge part from the source image after zooming in, so as to obtain the target image.

With reference to the second aspect and the preceding implementation manners, in another implementation manner of the second aspect, the adjusting unit is further configured to preprocess original images corresponding to the N screens so as to obtain source images that correspond to the N screens and have same dimensions as the target images, where dimensions of the original images are the same as or different from dimensions of the target images.

With reference to the second aspect and the preceding implementation manners, in another implementation manner of the second aspect, the adjusting unit is specifically configured to: if the dimensions of the original images are the same as the dimensions of the target images, take the original images as the source images; and if the dimensions of the original images are different from the dimensions of the target images, separately zoom in or out, prune, and/or pad the original images corresponding to the N screens so as to obtain corresponding source images.

With reference to the second aspect and the preceding implementation manners, in another implementation manner of the second aspect, the adjusting unit is specifically configured to: if aspect ratios of the original images are the same as aspect ratios of the target images and the width w of the original images is different from the width d of the target images, proportionally zoom in or out, according to a zoom factor m, the original images corresponding to the N screens so as to obtain corresponding source images, where m=d/w; and the determining unit is specifically configured to determine that the first width a=n×A, where n=m, and A is the width of a blind spot between the original images corresponding to the N screens.

With reference to the second aspect and the preceding implementation manners, in another implementation manner of the second aspect, the adjusting unit is specifically configured to: if aspect ratios of the original images are different from aspect ratios of the target images, proportionally zoom in or out, according to a zoom factor m1, the original images corresponding to the N screens so as to obtain corresponding intermediate images, where m1=e/h, e is the height of the target images, and h is the height of the original images; and prune or pad an edge that has a total width of |d−(ew/h)| from or into one or two sides of the intermediate images corresponding to the N screens, so as to obtain corresponding source images, where d is the width of the target images, w is the width of the original images, and || is a calculation of taking an absolute value; and the determining unit is specifically configured to determine that the first width a=n×A, where n=(2Ae+ew−dh)/2Ah, and A is the width of a blind spot between the original images corresponding to the N screens.

According to the embodiments of the present invention, the width of a blind spot between source images and the width of a gap between display devices of target images are acquired, and the source images are adjusted according to the acquired width values so as to obtain stitched target images without a mismatch, thereby improving a sense of reality of telepresence.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1A:
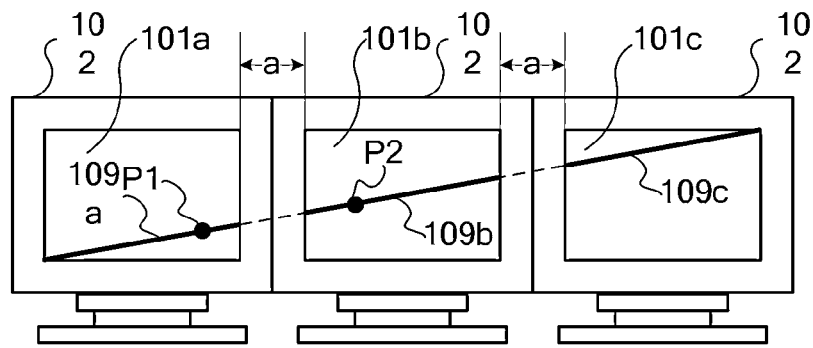
FIG. 1A and FIG. 1B are schematic diagrams of scenarios to which embodiments of the present invention are applicable.
Figure 1A:
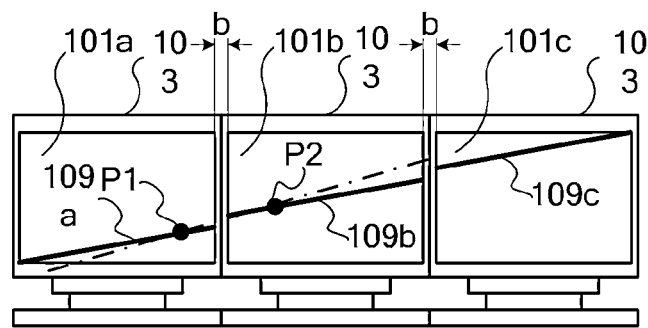
Figure 1B:
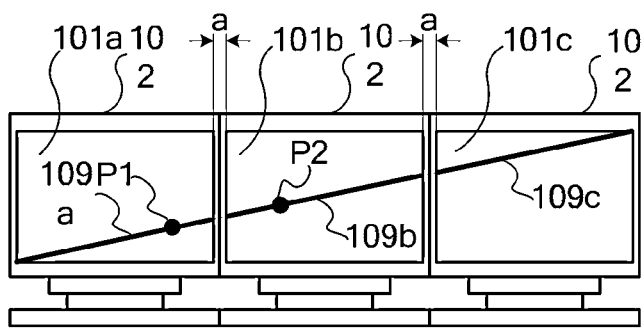
Figure 1B:
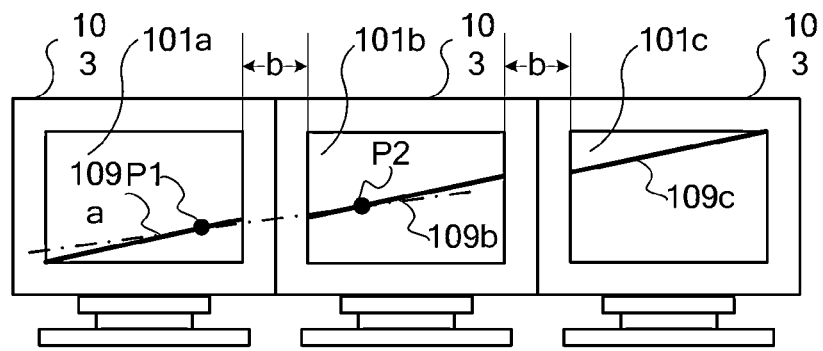

FIG. 1A and FIG. 1B are schematic diagrams of scenarios to which embodiments of the present invention are applicable. In the following embodiments, it is assumed that both source images and target images occupy 3 screens. However, the embodiments of the present invention are not limited to this. The number N of screens occupied by the source images and that of screens occupied by the target images may be any integer greater than 1. In addition, it is assumed that the 3 screens are of a same size and are arranged side by side at a same height.

The arranging side by side may specifically be arranging side by side in a straight line and may also be arranging side by side in a curve or in a zigzag line.

The same height refers to that bottoms or tops of the N screens are at a same level.

The upper part of FIG. 1A is a schematic diagram showing source images 101a, 101b, and 101c. The schematic diagram illustrates three virtual display devices 102 (shaded parts in FIG. 1A) of a same specification. A virtual display device 102 is a display device that is expected to display a source image 101 when the source image 101 is generated, but may not certainly conform to an actual specification of a display device at a target end, for example, the width, the height, and an aspect ratio may be different to a certain extent. The width refers to a dimension in a horizontal direction, and the height refers to a dimension in a vertical direction. If it is unnecessary to distinguish three source images 101a-101c from each other, they are collectively called source images 101 below. The source images 101 are generated according to the specification of the display devices 102. For the purpose of implementing stitching without a mismatch, it is required that the width a of a blind spot between the source images 101 equal the width of a gap between the display devices 102, that is, doubling the width of a left frame or a right frame of a display device 102. As shown in FIG. 1A, stitching the source images 101 without a mismatch enables lines 109a, 109b, and 109c to be in a same straight line.

It should be noted that, in the description of the embodiments of the present invention, it is assumed that a displayable area of a display device occupies the entire screen of the display device, that is, no non-displayable area exists on the screen of the display device Therefore, the frame here may be a physical frame for adjoining two display devices. However, the embodiments of the present invention do not set a limitation to this. For example, if there is a non-displayable area inside the physical frame of a display device, the width of a gap between display devices needs also to include the corresponding width of the non-displayable area. This implementation manner also falls within the scope of the embodiments of the present invention.

The lower part of FIG. 1A is a schematic diagram of three display devices 103 of the target images, where the display devices 103 also separately display the source images 101a-101c. Dimensions of a display area of a display device 103 are the same as those of a display area of a display device 102, but the width of a frame of a display device 103 is narrower than that of a display device 102. Therefore, the width b of a gap between the display devices 103 is less than a. In the prior art, the width b of a gap between the display devices 103 is not considered during generation of the source images 101, and only the width a of a blind spot is considered. In this case, if the source images 101 are displayed on the display devices 103 without processing, a gradient (for example, a gradient relative to a horizontal line) of a straight line determined by two actual scenario points that are separately displayed on two source images on adjacent screens may be different from a gradient of a straight line determined by the two actual scenario points that are separately displayed on two target images on adjacent screens. Visually, as shown in FIG. 1A, the lines 109a, 109b, and 109c are not in the same straight line any longer. For example, FIG. 1A illustrates two actual scenario points P1 and P2 that are respectively located at corresponding positions in the lines 109a and 109b. In the source images in the upper part, a gradient of a straight line determined by P1 and P2 is a gradient of the line 109a. However, in the target images in the lower part, a gradient of a straight line (a dot-dashed line at the lower part of FIG. 1A) determined by P1 and P2 is different from the gradient of the line 109a. This leads to a mismatch in image stitching and affects a sense of reality of telepresence.

FIG. 1B is a scenario where the width of a frame of a display device 103 is greater than that of a display device 102, that is, b is greater than a. As shown in FIG. 1B, similarly, it leads to that the lines 109a, 109b, and 109c are not located in the same straight line any longer, and the gradient of a straight line determined by P1 and P2 on source images is different from that determined by P1 and P2 on target images. This leads to a mismatch in image stitching and affects a sense of reality of telepresence.

Figure 2:
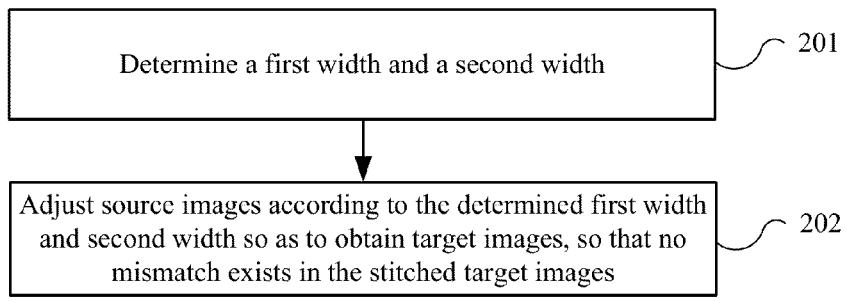
FIG. 2 is a schematic flowchart of an image processing method according to an embodiment of the present invention.

FIG. 2 is a schematic flowchart of an image processing method according to an embodiment of the present invention. The method in FIG. 2 may be executed by an image processing device at a target end. However, the embodiment of the present invention is not limited to this, and the image processing device may also be located on other entities apart from the target end.

201. Determine a first width and a second width. The second width is the width of a gap between display devices of target images on N screens, for example, the width b shown in FIG. 1A-FIG. 3C. The first width is the width of a blind spot between source images corresponding to the N screens, for example, the width a shown in FIG. 1A-FIG. 3C. N is an integer greater than 1.

Here, the width b of a gap between the display devices of the target images may be the width of a gap between actual display devices at a target conference site, for example, the width b approximately doubles the width of frame of the actual display device. The width b of a gap may also be the width of a gap between virtual display devices. For example, if a projection display manner is used at the target conference site, the width b of a gap may be an edge distance between projection areas of a projection curtain that are scheduled to display target images on two adjacent screens. For another example, if an image to be displayed is proportionally zoomed in or out (for example, by adjusting a distance between a projector and a projection curtain or through image processing) at the target conference site, the width b of a gap may be the width of a gap obtained after the corresponding proportional zooming. These changes all fall within the scope of the embodiment of the present invention.

The source images may specifically be images (referred to as original images below) shot by a camera at a source conference site and may also be images obtained by preprocessing the original images.

Specifically, if the dimensions of the original images are the same as those of the target images, that is, the same as dimensions of displayable areas of the display devices of the target images, for example, both the width and the height are the same, the original images are taken as the source images, and the width of a blind spot between the original images is taken as the width of a blind spot between the source images. If the dimensions of the original images are different from those of the target images, that is, different from dimensions of display areas of the display devices of the target images, for example, the width, the height, or aspect ratios are different, the original images are zoomed in or out, pruned, and/or padded to obtain the source images. In this case, Width of a blind spot between the source images=Width of a blind spot between the original images×Corresponding zoom factor (for example, the zoom factor n shown in FIG. 1C-FIG. 3C).

The following describes exemplary implementation manners for determining the width of a blind spot between the original images.

The width of a blind spot between the original images may specifically be determined by an image processing device according to a shooting parameter (for example, coordinates of a shooting area of a camera) of a camera for shooting a source image, where the shooting parameter is sent by the source conference site; may also be determined by an image processing device according to a specification parameter (for example, the width of a gap between display devices at the source conference site) of display devices at the source conference site, where the specification parameter is sent by the source conference site; and may still be directly sent by the source conference site.

The width of a blind spot between the original images may be calculated according to coordinates of shooting areas of adjacent cameras. For example, the horizontal-coordinate values of left and right edges of a shooting area of a first camera of the two adjacent cameras are 100 m and 200 m respectively, and the horizontal-coordinate values of left and right edges of a shooting area of the other camera are 210 m and 310 m respectively, and therefore, an area between the horizontal coordinate 200 m and the horizontal coordinate 210 m is beyond the shooting area, and this area is a blind spot, that is, a blind spot between adjacent images shot by the adjacent cameras, and the width of the blind spot is the difference between 200 m and 210 m, that is, 10 m. The width of a blind spot between the original images may specifically be determined through calculation according to coordinates of a shooting area that are sent by the source conference site, and may also be directly received from the source conference site after being calculated by the source conference site according to coordinates of a shooting area.

If an image shot by a camera is displayed in advance on a display device at a conference site (that is, the source conference site) where the camera is located and a shooting angle of a shooting device is adjusted so that the shot image is stitched and displayed on the display device without a mismatch, the width of a blind spot between the source images equals the width of a gap between display devices. The determining the width of a gap between the original images may specifically be receiving the width of a gap between the display devices at the source conference site, where the width of a gap is sent by a device at the source conference site; and determining the received width as the width of a blind spot between the original images.

Optionally, a manner for sending a shooting parameter (for example, coordinates of a shooting area of a camera) of a camera, a specification parameter of display devices (for example, the width of a gap between display devices at the source conference site), or the width of a blind spot may specifically be carried and sent through an extended media name and transport address (media name and transport address) field (that is an "m=" line) of Session Description Protocol (SDP, Session Description Protocol) information, that is, by carrying it into the media name and transport address field during conference capability negotiation.

Optionally, as an embodiment, the second width may be extracted by an image processing device according to a system specification parameter (for example, a specification parameter of a display device) and may also be obtained according to an input of a user. The embodiment of the present invention does not set a limitation to this.

202. When the first width a is different from the second width b (a≠b), adjust the source images according to the determined first width and second width to obtain the target images, so that no mismatch exists in the stitched target images on the N screens.

For the purpose of implementing stitching of target images without a mismatch, it is required to ensure that a gradient (for example, a gradient relative to a horizontal line) of a straight line determined by two actual scenario points that are separately displayed on two source images on adjacent screens is identical to a gradient of a straight line determined by the two actual scenario points that are separately displayed on two target images on adjacent screens. Visually, it is required that, in the target images on the N screens at the lower parts of FIG. 1A and FIG. 1B, lines 109a, 109b, and 109c can still be in a same straight line. A display result in this case is identical to that in an actual scenario, and this produces a better sense of reality.

According to the embodiment of the present invention, the width of a blind spot between source images and the width of a gap between display devices of target images are acquired, and the source images are adjusted according to the acquired width values so as to obtain stitched target images without a mismatch, thereby improving a sense of reality of telepresence.

Optionally, as an embodiment, a manner for adjusting the source images to obtain the target images includes but is not limited to pruning, padding, zooming out, or zooming in a source image corresponding to one or more screens among the N screens.

Specifically, an input interface of a monitor includes a digital interface and an analog interface. The digital interface includes a DVI (Digital Visual Interface, digital visual interface), an HDMI (High Definition Multimedia Interface, high definition multimedia interface), or the like, and the analog interface includes a VGA (Video Graphics Array, video graphics array), or the like, where an input of the digital interface is an RGB color array, and an output of the analog interface is a YPbPr color array.

The pruning a source image may specifically be: calculating a part that needs to be pruned from the source image; determining, in a color array of the source image, a pixel area corresponding to the part that needs to be pruned; and discarding pixel data in the pixel area. The padding a source image may specifically be: calculating a part that needs to be padded; determining, in the color array of the source image, a position of a pixel area corresponding to the part that needs to be padded; and adding pixel data of a preset color into the pixel area corresponding to the position of the pixel area, where the pixel data of the preset color may specifically be RGB (125, 125, 125). The zooming out a source image may specifically be: calculating a zoom factor according to the first width and the second width; and when the first width is greater than the second width, compressing all pixels in the color array of the source image according to the zoom factor, where the compression may specifically be deleting pixel data of a part of pixel points according to the zoom factor. The zooming in a source image may specifically be: calculating a zoom factor according to the first width and the second width; and when the first width is less than the second width, stretching all pixels in the color array of the source image according to the zoom factor, where the stretching may specifically be adding pixel data of a transitive color between adjacent pixel data according to the zoom factor, for example, adding, between two adjacent pixel points with pixel values of RGB (11, 11, 11) and RGB (33, 33, 33), a new pixel point with pixel data of RGB (22, 22, 22).

Optionally, as another embodiment, when a source image corresponding to one or more screens among the N screens is pruned and padded to obtain a target image, a source image corresponding to a first screen among the N screens may be taken as a target image on the first screen, or a source image corresponding to a first screen may be pruned and padded as a target image on the first screen; and a source image corresponding to an adjacent screen of a first screen is pruned and padded as a target image on the adjacent screen.

Optionally, as another embodiment, when the first width is greater than the second width and the source image corresponding to the adjacent screen of the first screen is pruned as the target image on the adjacent screen, a part that has a width of c may be pruned from a side that is in the source image corresponding to the adjacent screen and is away from the first screen, and an edge that is in the preset color and has a width of c may be padded into a side that is in the source image corresponding to the adjacent screen and is near the first screen, so as to obtain the target image on the adjacent screen, where c=a−b, a is the first width, and b is the second width.

The pruning a part that has a width of c from a side that is in the source image corresponding to the adjacent screen and is away from the first screen may specifically be: determining, in the color array of the source image, a pixel area corresponding to the part that has a width of c and is on the side that is in the source image corresponding to the adjacent screen and is away from the first screen; and discarding pixel data in the pixel area. The padding an edge that is in the preset color and has a width of c into a side that is in the source image corresponding to the adjacent screen and is near the first screen may specifically be: determining, in the color array of the source image, a position of a pixel area corresponding to the part that has a width of c and is on the side that is in the source image corresponding to the adjacent screen and is near the first screen; and adding pixel data of the preset color into the pixel area.

Optionally, as another embodiment, when the first width is less than the second width and the source image corresponding to the adjacent screen of the first screen is pruned as the target image on the adjacent screen, a part that has a width of c may be pruned from a side that is in the source image corresponding to the adjacent screen and is near the first screen, and an edge that is in the preset color and has a width of c may be padded into a side that is in the source image corresponding to the adjacent screen and is away from the first screen, so as to obtain the target image on the adjacent screen, where c=b−a, a is the first width, and b is the second width.

The pruning a part that has a width of c from a side that is in the source image corresponding to the adjacent screen and is near the first screen may specifically be: determining, in the color array of the source image, a pixel area corresponding to the part that has a width of c and is on the side that is in the source image corresponding to the adjacent screen and is near the first screen; and discarding pixel data in the pixel area. The padding an edge that is in the preset color and has a width of c into a side that is in the source image corresponding to the adjacent screen and is away from the first screen may specifically be: determining, in the color array of the source image, a position of a pixel area corresponding to the part that has a width of c and is on the side that is in the source image corresponding to the adjacent screen and is away from the first screen; and adding pixel data of the preset color into the pixel area.

Optionally, as another embodiment, when the source image corresponding to the first screen is pruned as the target image on the first screen, an edge that has a width of f may be pruned from two sides of the source image corresponding to the first screen, and an edge that is in the preset color and has a width of f may be separately padded into the two sides of the source image corresponding to the first screen, where f<=|a−b|. and preferably, f=|a−b|/2 or f=|a−b|.

The pruning an edge that has a width of f from two sides of the source image corresponding to the first screen may specifically be: determining, in the color array of the source image, a pixel area corresponding to the part that has a width of f and is on the two sides of the source image corresponding to the first screen; and discarding pixel data in the pixel area. The padding an edge that is in the preset color and has a width off separately into the two sides of the source image corresponding to the first screen may specifically be: determining, in the color array of the source image, a position of a pixel area corresponding to the part that has a width of f and is on the two sides of the source image corresponding to the first screen; and adding pixel data of the preset color into the pixel area.

Optionally, as another embodiment, when the first width is greater than the second width and the source image corresponding to one or more screens among the N screens is zoomed out and padded to obtain the target image, the source image is zoomed out according to a zoom factor k, where k=(b+d)/(a+d), a is the first width, b is the second width, and d is the width of the source image; and an edge in the preset color is padded around the source image after zooming out, so as to obtain the target image. A position of a central point of an image may remain unchanged during the zooming.

The zooming out the source image according to a zoom factor k may specifically be: compressing all pixels in the color array of the source image according to the zoom factor k, where the compression may specifically be deleting pixel data of a part of pixel points according to the zoom factor. The padding an edge in a preset color around the source image after zooming out specifically is: calculating a part that needs to be padded around the source image after zooming out; determining, in the color array of the source image, a position of a pixel area corresponding to the part that needs to be padded; and adding pixel data of the preset color into the pixel area.

Optionally, as another embodiment, when the first width is less than the second width and the source image corresponding to one or more screens among the N screens is zoomed in and padded to obtain the target image, the source image is zoomed in according to a zoom factor k, where k=(b+d)/(a+d), a is the first width, b is the second width, and d is the width of the source image; and an edge part is pruned from the source image after zooming in, so as to obtain the target image. The edge part is specifically a part that is in the source image after zooming in and is beyond the scope of the target image. A position of a central point of an image may remain unchanged during the zooming.

The zooming in the source image according to a zoom factor k may specifically be: stretching all pixels in the color array of the source image according to the zoom factor k, where the stretching may specifically be adding, between adjacent pixel data, pixel data of a transitive color according to the zoom factor. The pruning the edge part from the source image after zooming in may specifically be: calculating the edge part of the source image after zooming in; determining, in the color array of the source image, a pixel area corresponding to the edge part; and discarding pixel data in the pixel area.

Optionally, as another embodiment, the preset color may be a frame color of a display device of the target image or be close to a frame color of a display device of the target image, for example, if the frame color of the display device is RGB (125, 125, 125), the preset color may be set to (125, 125, 125), (120, 120, 120), or the like.

Optionally, as another embodiment, before step 202, a manner for adjusting the source image may be determined according to a presetting or through a user instruction. For example, multiple adjusting manners may be provided for the user to select, and one of the adjusting manners is selected according to the preference of the user. For example, the adjusting manners may include but are not limited to "pruning and padding an image", "zooming in or out an image", and the like.

In addition, preferably, in the embodiment of the present invention, a source image and a target image have same dimensions, that is, it is required that both the width and the height of a source image are the same as those of a target image. A source image may be an original image that is actually transmitted during a video conference and may also be an image obtained after an original image is preprocessed. When both the width and the height of an original image are the same as those of a target image, the original image may be directly taken as the source image; otherwise, the original image needs to be preprocessed to obtain the source image that meets the preceding requirement.

When an original image is preprocessed, the original image may be zoomed in or out, pruned, and/or padded so as to obtain a source image having the same dimensions as the target image. The following describes a manner for preprocessing an original image according to the embodiment of the present invention with reference to specific examples. However, these examples are only used to help a person skilled in the art to better understand the embodiment of the present invention rather than limiting the scope of the embodiment of the present invention.

Optionally, as another embodiment, original images corresponding to the N screens may further be preprocessed to obtain source images that correspond to the N screens and have the same dimensions as the target images, where dimensions of the original images may be the same as or different from those of the target images.

Optionally, as another embodiment, if the dimensions of the original images are the same as those of the target images, the original images are taken as the source images. In this case, it may be determined in step 201 that the first width a is the width A (a=A) of a blind spot between the original images.

In another aspect, if the dimensions of the original images are different from those of the target images, the original images corresponding to the N screens are separately adjusted to obtain corresponding source images A manner for adjusting an original image to obtain a source image includes but is not limited to pruning, padding, or zooming in or out the original image.

The pruning the original image may specifically be: calculating a part that needs to be pruned from the original image; determining, in a color array of the original image, a pixel area corresponding to the part that needs to be pruned; and discarding pixel data in the pixel area. The padding the original image may specifically be: calculating a part that needs to be padded; determining, in the color array of the original image, a position of a pixel area corresponding to the part that needs to be padded; and adding pixel data of a preset color into the pixel area corresponding to the position of the pixel area, where the pixel data of the preset color may specifically be RGB (125, 125, 125). The zooming out the original image may specifically be: calculating a zoom factor according to the width of the original image and the width of a target image; and when the width of the original image is greater than the width of the target image, compressing all pixels in a color array of the original image according to the zoom factor, where the compression may specifically be deleting pixel data of a part of pixel points according to the zoom factor. The zooming in the original image may specifically be: calculating a zoom factor according to the width of the original image and the width of a target image; and when the width of the original image is less than the width of the target image, stretching all pixels in the color array of the original image according to the zoom factor, where the stretching may specifically be adding pixel data of a transitive color between adjacent pixel data according to the zoom factor, for example, adding, between two adjacent pixel points with pixel values of RGB (11, 11, 11) and RGB(33, 33, 33), a new pixel point with pixel data of RGB (22, 22, 22).

For example, if aspect ratios of the original images are the same as those of the target images, but the width w of the original images is different from the width d of the target images, the original images corresponding to the N screens are proportionally zoomed in or out according to a zoom factor m so as to obtain corresponding source images, where m=d/w. In this case, it may be determined in step 201 that the first width a=n×A, where n=m, and A is the width of a blind spot between the original images corresponding to the N screens.

Figure 3A:
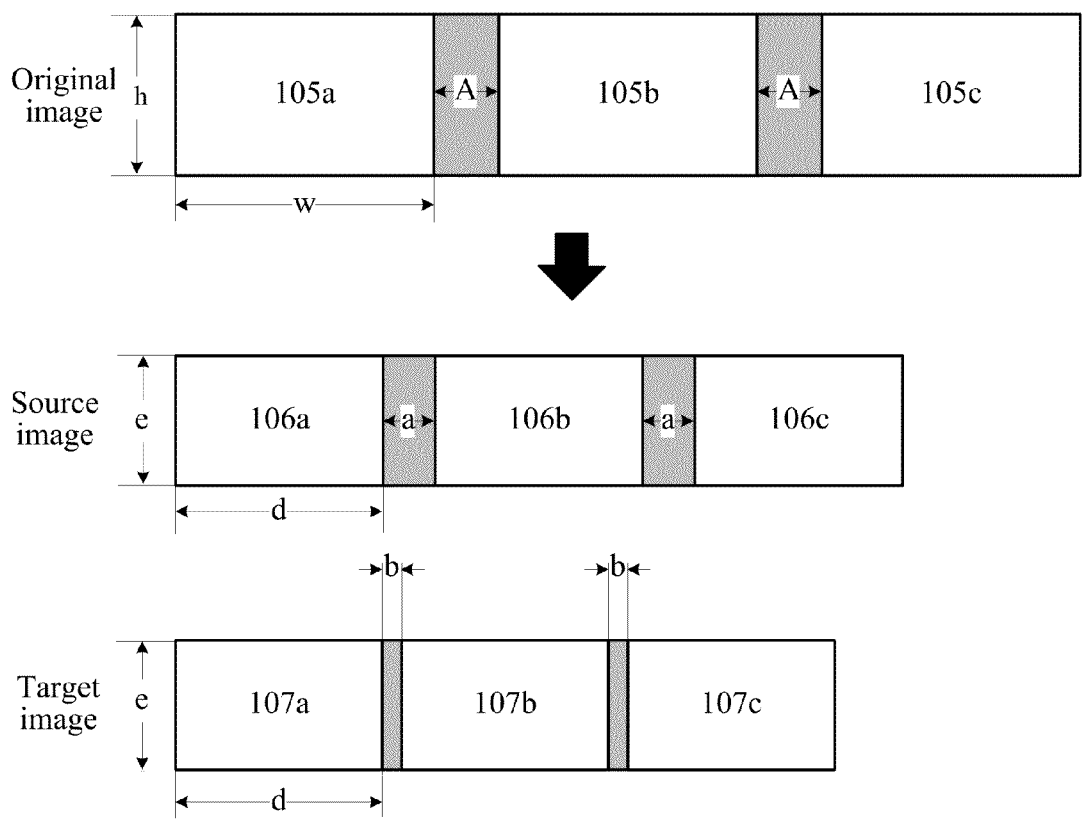
FIG. 3A-FIG. 3C are schematic diagrams of examples of obtaining source images from original images.

Specifically, FIG. 3A is a schematic diagram of an example of obtaining source images from original images. In the example of FIG. 3A, the original images have a larger size than target images, but they have a same aspect ratio. For brevity, display devices are omitted in the example of FIG. 3A, and only outlines of stitched images are illustrated.

As shown in FIG. 3A, original images 105*a*, 105*b*, and 105*c* are at a height of h and at a width of w. If it is unnecessary to distinguish them from each other, the original images 105*a*, 105*b*, and 105*c* may be collectively called original images 105 below. The width of a blind spot between the original images 105 is A. The width A of a blind spot equals the width of a gap between virtual display devices of the original images 105, and therefore the original images 105 may be stitched without a mismatch.

Target images 107a-c may be the same as the target images in FIG. 1A/1B. The target images 107 are at a height of e and at a width of d, and the width of a gap between display devices is b.

In the embodiment of FIG. 3A, aspect ratios of the original images 105 equal aspect ratios of the target images 107, that is, w/h=d/e. In this case, the original images 105 need to be proportionally zoomed in or out so as to obtain corresponding source images 106a-c. The proportional zooming refers to zooming according to a same ratio of the height of an image to the width of the image. Specifically, a zoom factor is m=e/h=d/w, and therefore, the width of a blind spot between the source images 106 is a=m×A. In the embodiment of the present invention, the source images 106 are adjusted based on the width a of a blind spot between the source images 106.

The embodiment of FIG. 3A gives an example where the original images 105 are larger than the target images 107 and the width a is greater than the width b. However, the embodiment of the present invention is not limited to this, a case where the original images 105 are smaller than the target images or the width a is less than the width b is also applicable to the embodiment of the present invention, that is, it is obtained that the width of a blind spot between the source images 106 is a=m×A, where a zoom factor of the width of a blind spot is n=m=e/h=d/w.

For another example, if aspect ratios of the original images are different from those of the target images, the original images corresponding to the N screens are proportionally zoomed in or out according to a zoom factor m1, so as to obtain corresponding intermediate images, where m1=e/h, e is the height of the target images, and h is the height of the original images. Then, an edge that has a total width of |d−(ew/h)| is pruned from or padded into one or two sides of the intermediate images corresponding to the N screens so as to obtain corresponding source images, where d is the width of the target images, w is the width of the original images, and || is a calculation of taking an absolute value.

In this case, it may be determined in step 201 that the first width a=n×A, where n=(2Ae+ew−dh)/2Ah, and A is the width of a blind spot between the original images corresponding to the N screens.

Figure 3B:
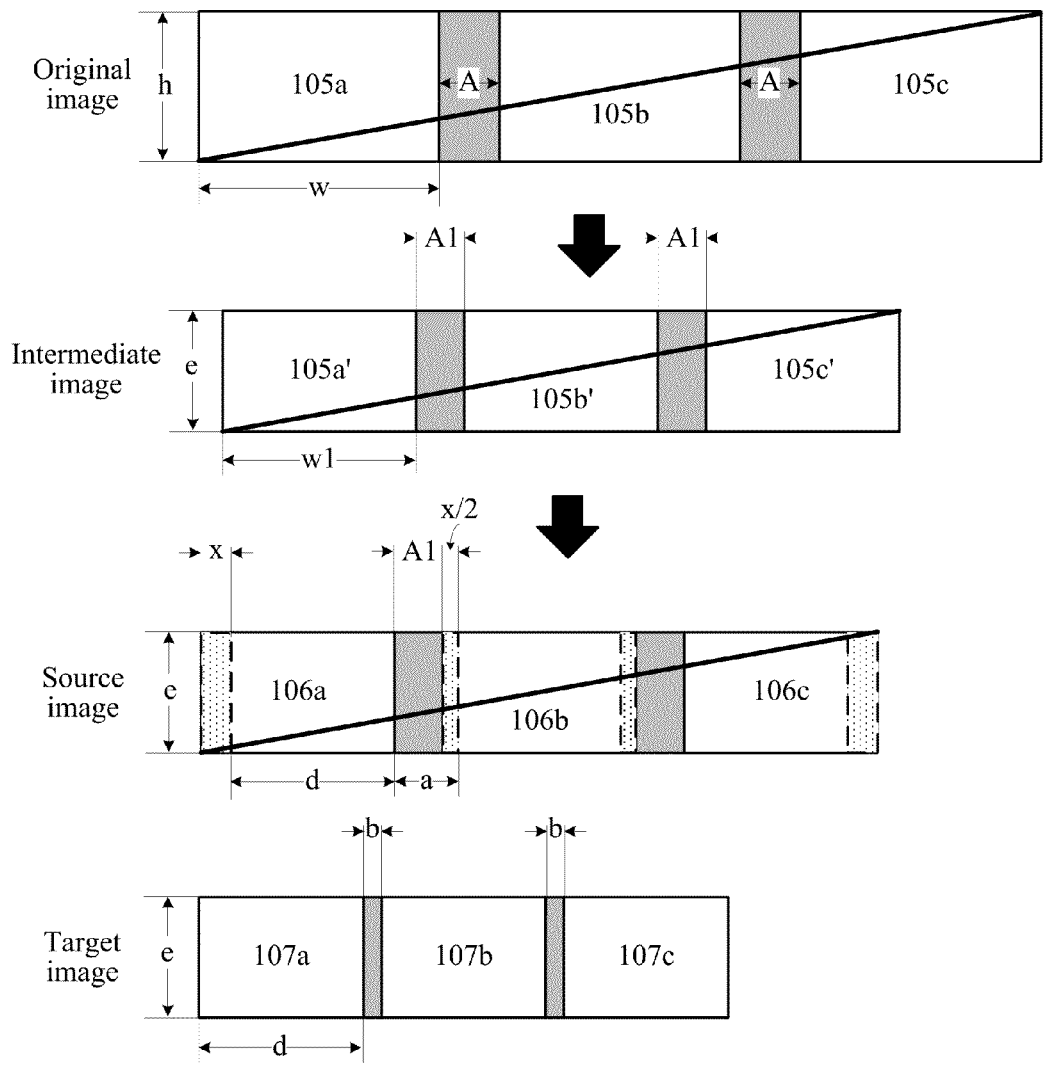

Specifically, FIG. 3B is a schematic diagram of another example of obtaining source images from original images. In the example of FIG. 3B, the original images have a larger size and a greater aspect ratio (w/h>d/e) than target images. For brevity, display devices are omitted in the example of FIG. 3B, and only outlines of stitched images are illustrated.

As shown in FIG. 3B, firstly, original images 105 are proportionally zoomed in or out to obtain intermediate images 105a'-c' (referred to as intermediate images 105' below). A zoom factor m1=e/h, where e is the height of the target images, and h is the height of the original images. Therefore, the width of the intermediate images 105' is w1=m1×w=ew/h, and the width of a blind spot between the intermediate images 105' is A1=m1×A=Ae/h. Here, if the height h of the original images 105 is h=e, the original images 105 may also be directly taken as the intermediate images 105' (that is, equivalent to m1=1).

As the width w1 of the intermediate images 105' is still greater than the width d of the target images, the intermediate images 105' may be pruned to obtain source images 106. Specifically, as shown by the dot-shaded part in FIG. 3B, an edge that has a width of x is pruned from the left side of an intermediate image 105a' to obtain a source image 106a, an edge that has a width of x is pruned from the right side of an intermediate image 105c' to obtain a source image 106c, and an edge that has a width of x/2 is separately pruned from two sides of an intermediate image 105b' to obtain a source image 106b, where x=w1−d=(ew/h)−d. In this way, dimensions of the source images 106 are the same as those of target images 107, and this can simultaneously meet a requirement for stitching without a mismatch.

Therefore, the width of a blind spot between the source images 106 is a=A1+x/2=(2Ae+ew−dh)/2h, that is, a zoom factor of the width of a blind spot is n=a/A=(2Ae+ew−dh)/2Ah. In the embodiment of the present invention, the source images 106 are adjusted based on the width a of a blind spot between the source images 106.

Figure 3C:
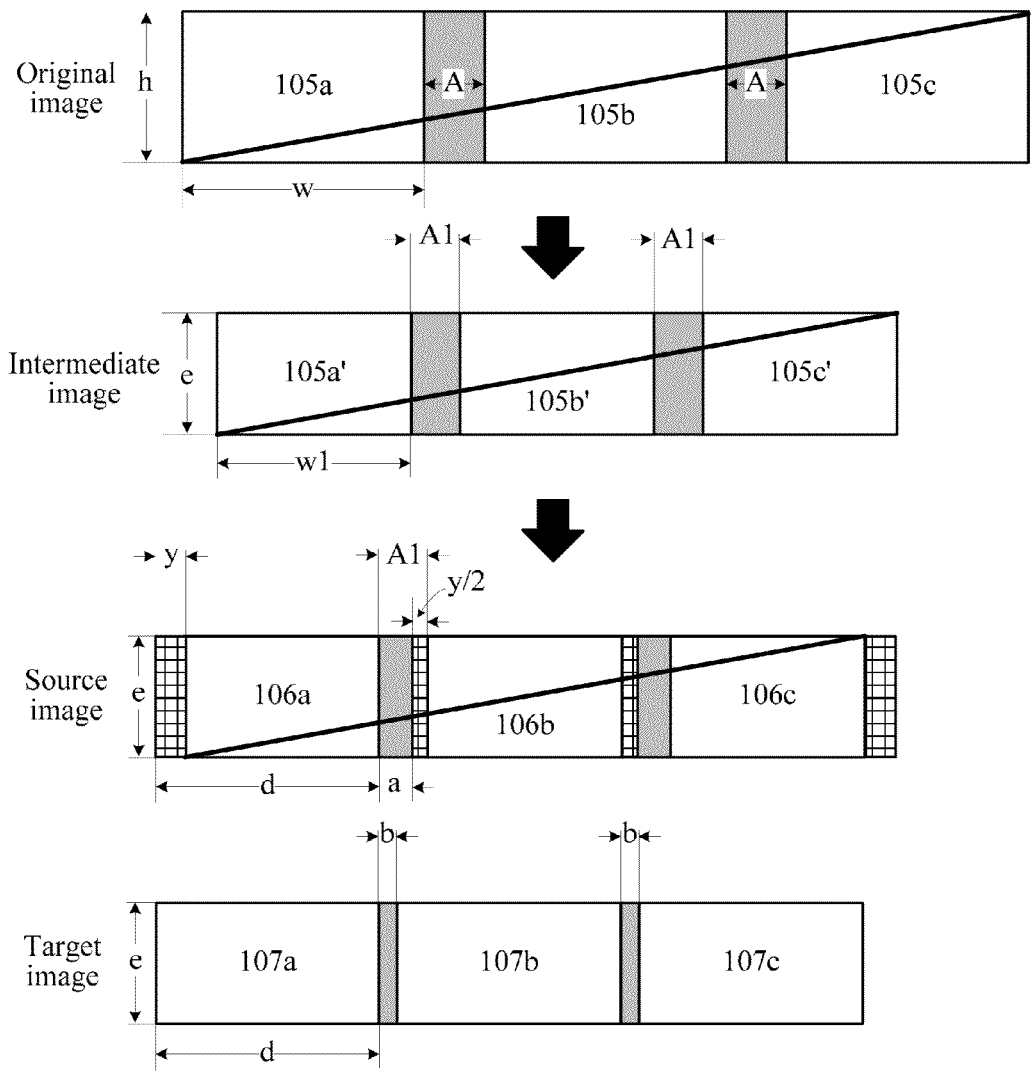

FIG. 3C is a schematic diagram of another example of obtaining source images from original images. In the example of FIG. 3C, the original images have a larger size and a smaller aspect ratio (w/h<d/e) than target images. For brevity, display devices are omitted in the example of FIG. 3C, and only outlines of stitched images are illustrated.

A manner for obtaining intermediate images 105' from original images 105 in the embodiment of FIG. 3C is the same as that in the embodiment of FIG. 3B, and therefore no further details are provided herein. The width of the intermediate images 105' is w1=m1×w=ew/h, and the width of a blind spot between the intermediate images 105' is A1=m1×A=Ae/h.

As the width w1 of the intermediate images 105' is less than the width d of the target images, the intermediate images 105' may be padded to obtain source images 106. Specifically, as shown by the grid-shaded part in FIG. 3C, an edge that has a width of y is padded into a left side of an intermediate image 105a' to obtain a source image 106a, an edge that has a width of y is padded into a right side of an intermediate image 105c' to obtain a source image 106c, and an edge that has a width of y/2 is separately padded into two sides of an intermediate image 105b' to obtain a source image 106b, where y=d−w1=d−(ew/h). In this way, dimensions of the source images 106 are the same as those of target images 107, and this can simultaneously meet a requirement for stitching without a mismatch.

Therefore, the width of a blind spot between the source images 106 is a=A1−y/2=(2Ae+ew−dh)/2h, that is, a zoom factor of the width of a blind spot is n=a/A=(2Ae+ew−dh)/2Ah. In the embodiment of the present invention, the source images 106 are adjusted based on the width a of a blind spot between the source images 106.

According to the methods in FIG. 3A-FIG. 3C, source images having the same dimensions as target images can be obtained, and it is ensured that the source images are stitched without a mismatch as the original images. That is, a gradient of a straight line determined by two actual scenario points that are separately displayed on two original images corresponding to adjacent screens is identical to a gradient of a straight line determined by the two actual scenario points that are separately displayed on two source images corresponding to adjacent screens.

The following describes in further detail the embodiment of the present invention with reference to specific examples. It should be noted that these examples are only used to help a person skilled in the art to better understand the embodiment of the present invention rather than limiting the scope of the embodiment of the present invention. For example, in FIG. 4-FIG. 10, examples where source images and target images have the same dimensions and N=3 are illustrated. However, the embodiment of the present invention is not limited to this and may be similarly applied to a case where N=2 or N>3. This application also falls within the scope of the embodiment of the present invention. In addition, for brevity, display devices are not illustrated in the following embodiments.

Figure 4A:
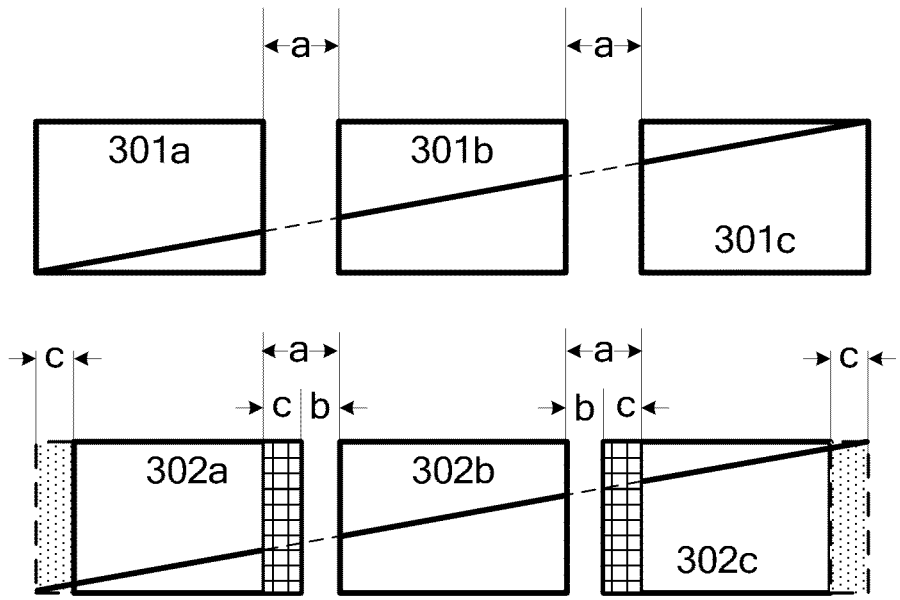
FIG. 4A is a schematic diagram of an image processing manner according to an embodiment of the present invention.

FIG. 4A is a schematic diagram of an image processing manner according to an embodiment of the present invention. The embodiment of FIG. 4A is applied to the scenario shown in FIG. 1A, where no processing is performed on an intermediate screen, that is, a source image 301$b$ corresponding to the intermediate screen is directly taken as a target image 302$b$ of the intermediate screen. Only source images 301$a$ and 301$c$ that correspond respectively to left and right screens (that is, screens adjacent to the intermediate screen) are adjusted to obtain corresponding target images 302$a$ and 302$c$. It is assumed that the width of both the source images and the target images is d.

The upper part of FIG. 4A is a schematic diagram of source images 301. The width of a blind spot between the source images 301 is a first width a. The lower part of FIG. 4A is a schematic diagram of target images 302. The width of a gap between display devices of the target images 302 is a second width b, and a>b.

The source images 301$a$ and 301$c$ corresponding to the adjacent screens may be moved by a width of c toward sides that are near the intermediate screen, that is, an edge that has a width of c is pruned from sides that are in the source images 301$a$ and 301$c$ and are away from the intermediate screen, and an edge that is in a preset color and has a width of c is padded into sides that are in the source images 301$a$ and 301$c$ corresponding to the adjacent screens and are near the intermediate screen, so as to obtain the target images 302$a$ and 302$c$ of the adjacent screens.

Specifically, firstly, as shown by the dot-shaded areas in FIG. 4A, the source image 301$a$ is moved by a width of c rightward, that is, pruning an edge that has a width of c from a left side of the source image 301$a$; and the source image 301$c$ is moved by a width of c leftward, that is, pruning an edge that has a width of c from a right side of the source image 301$c$.

Then, as shown by the grid-shaded areas in FIG. 4A, an edge that has a width of c is padded into a right side of the pruned source image 301$a$, and an edge that has a width of c is padded into a left side of the pruned source image 301$c$. In this way, the target images 302$a$ and 302$c$ are separately obtained.

The target images 302 obtained according to FIG. 4A have the same dimensions as the source images 301. Although effective display areas (non-shaded parts in FIG. 4A) of the target images 302 are smaller than those of the source images 301, it is ensured that no mismatch exists in stitched images 302, and the three slanting lines in FIG. 4A are still kept in a same straight line. An effective display area is an area that is in an image and contains conference scene content, for example, an area that contains personnel who participates in a conference, the background, and the like.

Optionally, as an embodiment, a color of a padded edge (a grid-shaded part in FIG. 4A) may be the same as or close to a frame color of a display device, so that a user may visually consider the padded part as a part of the frame of the display device when viewing a target image, and this can enhance visual perception of the user.

In addition, according to the embodiment of FIG. 4A, an image in true-to-life dimensions can be maintained, thereby enhancing user experience.

Figure 4B:
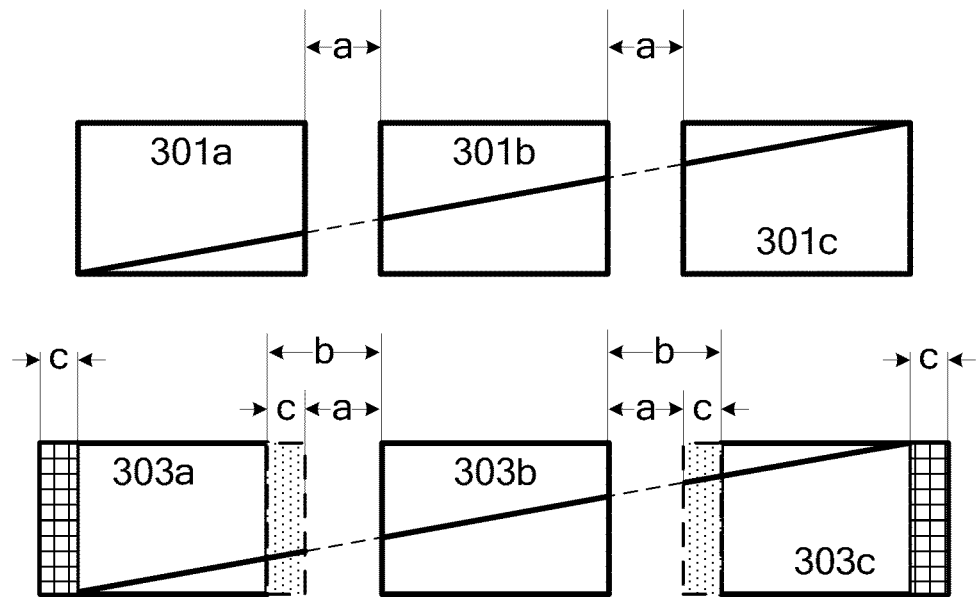
FIG. 4B is a schematic diagram of an image processing manner according to another embodiment of the present invention.

FIG. 4B is a schematic diagram of an image processing manner according to another embodiment of the present invention. The embodiment of FIG. 4B is applied to the scenario shown in FIG. 1B, where no processing is performed on an intermediate screen, that is, a source image 301$b$ corresponding to the intermediate screen is directly taken as a target image 303$b$ of the intermediate screen. Only source images 301$a$ and 301$c$ that correspond respectively to left and right screens (that is, screens adjacent to the intermediate screen) are adjusted to obtain corresponding target images 303$a$ and 303$c$. It is assumed that the width of both the source images and the target images is d.

The upper part of FIG. 4B is a schematic diagram of source images 301. The width of a blind spot between the source images 301 is a first width a. The lower part of FIG. 4B is a schematic diagram of target images 303. The width of a gap between display devices of the target images 303 is a second width b, and a<b.

The source images 301$a$ and 301$c$ corresponding to the adjacent screens may be moved by a width of c (c=b−a) toward sides that are away from the intermediate screen, that is, an edge that has a width of c is pruned from sides that are in the source images 301$a$ and 301$c$ and are near the intermediate screen, and an edge that is in a preset color and has a width of c is padded into sides that are in the source images 301$a$ and 301$c$ corresponding to the adjacent screens and are away from the intermediate screen, so as to obtain the target images 303$a$ and 303$c$ of the adjacent screens.

Specifically, firstly, as shown by the dot-shaded areas in FIG. 4B, the source image 301$a$ is moved by a width of c leftward, that is, pruning an edge that has a width of c from a right side of the source image 301$a$; and the source image 301$c$ is moved by a width of c rightward, that is, pruning an edge that has a width of c from a left side of the source image 301$c$.

Then, as shown by the grid-shaded areas in FIG. 4B, an edge that has a width of c is padded into a right side of the pruned source image 301$c$, and an edge that has a width of c is padded into a left side of the pruned source image 301$a$. In this way, the target images 303$a$ and 303$c$ are obtained.

The target images 303 obtained according to FIG. 4B have the same dimensions as the source images 301. Although effective display areas (non-shaded parts in FIG. 4B) of the target images 303 are smaller than those of the source images 301, it is ensured that no mismatch exists in stitched images 303, and the three slanting lines in FIG. 4B are still kept in a same straight line.

Optionally, as an embodiment, a color of a padded edge (a grid-shaded part in FIG. 4B) may be the same as or close to a frame color of a display device, so that a user may visually consider the padded part as a part of the frame of the display device when viewing a target image, and this can enhance visual perception of the user.

In addition, according to the embodiment of FIG. 4B, an image in true-to-life dimensions can be maintained, thereby enhancing user experience.

Figure 5:
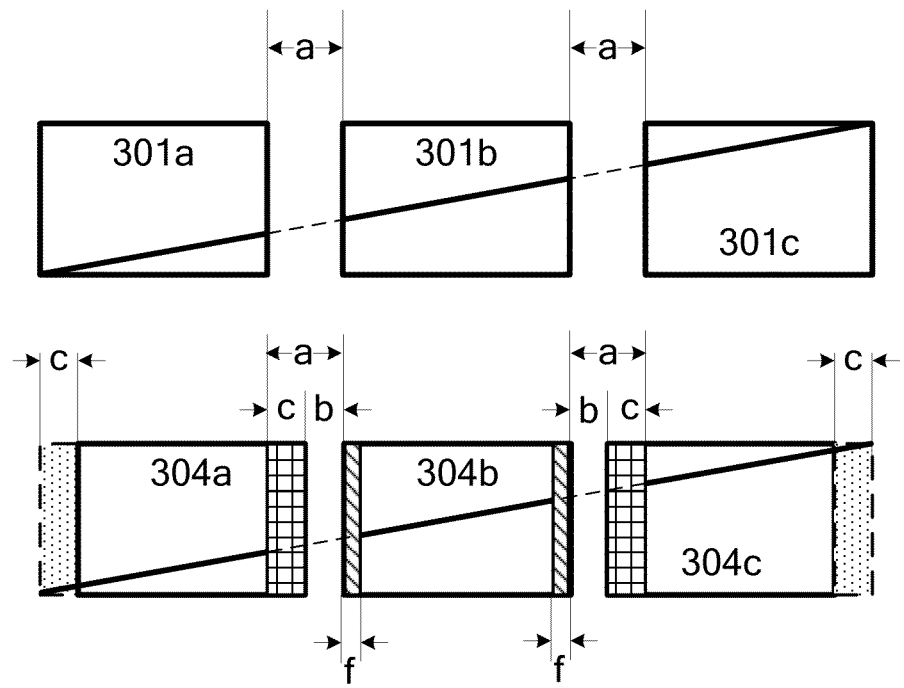
FIG. 5 is a schematic diagram of an image processing manner according to another embodiment of the present invention.

FIG. 5 is a schematic diagram of an image processing manner according to another embodiment of the present invention. The embodiment of FIG. 5 is a variation on the embodiment of FIG. 4A and is applied to the scenario shown in FIG. 1A, where a source image 301$b$ corresponding to an intermediate screen is also pruned.

Specifically, a method for obtaining a target image 304$a$ in FIG. 5 is the same as the method for obtaining the target image 302$a$ in FIG. 4A, and a method for obtaining a target image 304$c$ in FIG. 5 is the same as the method for obtaining the target image 302$c$ in FIG. 4A. Therefore, no further details are provided herein.

As shown by the slant-shaded parts in FIG. 5, an edge that has a width of f is separately pruned from two sides of the source image 301$b$ corresponding to the intermediate screen, and an edge that is in a preset color and has a width of f is then padded into the pruned parts, so as to obtain a target image 304b of the intermediate screen. Optionally, the preset color of the padded edge may be the same as or close to a frame color of a display device, and this can enhance visual perception of a user.

In addition, in the example of FIG. 5, the width f=|a−b|/2. As a first width a is greater than a second width b, f=(a−b)/2.

According to the embodiment of FIG. 5, effective display areas (non-shaded parts in FIG. 5) of the three target images 304a, 304b, and 304c have the same dimensions, and an edge that has a total width of c is separately pruned on the basis of corresponding source images. This can enhance user experience.

Figure 6:
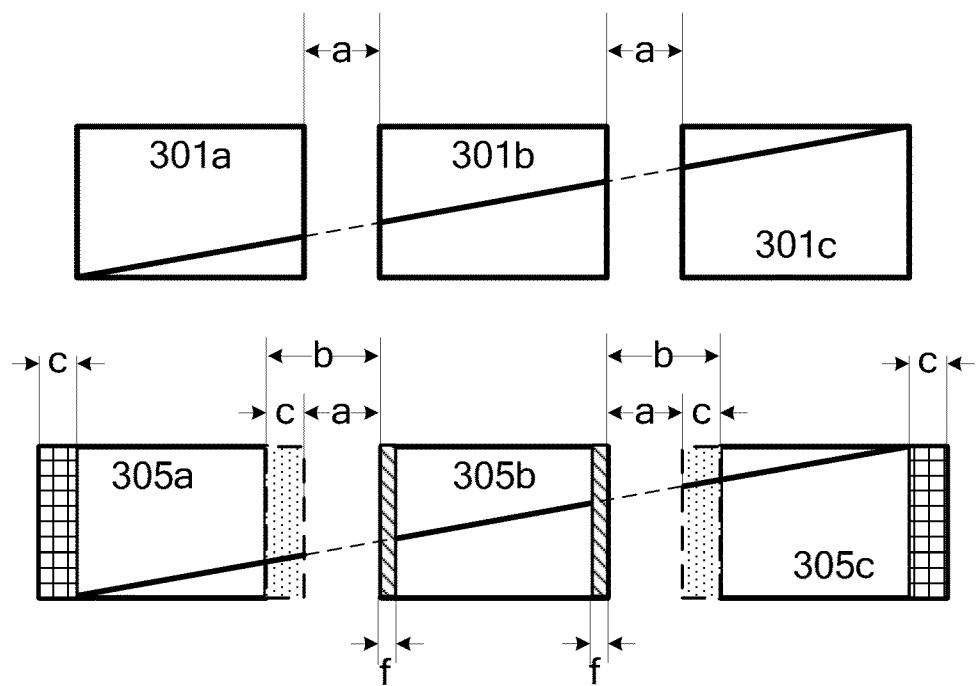
FIG. 6 is a schematic diagram of an image processing manner according to another embodiment of the present invention.

FIG. 6 is a schematic diagram of an image processing manner according to another embodiment of the present invention. The embodiment of FIG. 6 is a variation on the embodiment of FIG. 4B and is applied to the scenario shown in FIG. 1B, where a source image 301b corresponding to an intermediate screen is also pruned.

Specifically, a method for obtaining a target image 305a in FIG. 6 is the same as the method for obtaining the target image 303a in FIG. 4B, and a method for obtaining a target image 305c in FIG. 6 is the same as the method for obtaining the target image 303c in FIG. 4B. Therefore, no further details are provided herein.

As shown by the slant-shaded parts in FIG. 6, an edge that has a width of f is separately pruned from two sides of the source image 301b corresponding to the intermediate screen, and an edge that is in a preset color and has a width of f is then padded into the pruned parts, so as to obtain a target image 305b of the intermediate screen. Optionally, the preset color of the padded edge may be the same as or close to a frame color of a display device, and this can enhance visual perception of a user.

In addition, in the example of FIG. 6, the width f=|a−b|/2. As a first width a is less than a second width b, f=(b−a)/2.

According to the embodiment of FIG. 6, effective display areas (non-shaded parts in FIG. 6) of the three target images 305a, 305b, and 305c have the same dimensions, and an edge that has a total width of c is separately pruned on the basis of corresponding source images. This can enhance user experience.

Figure 7:
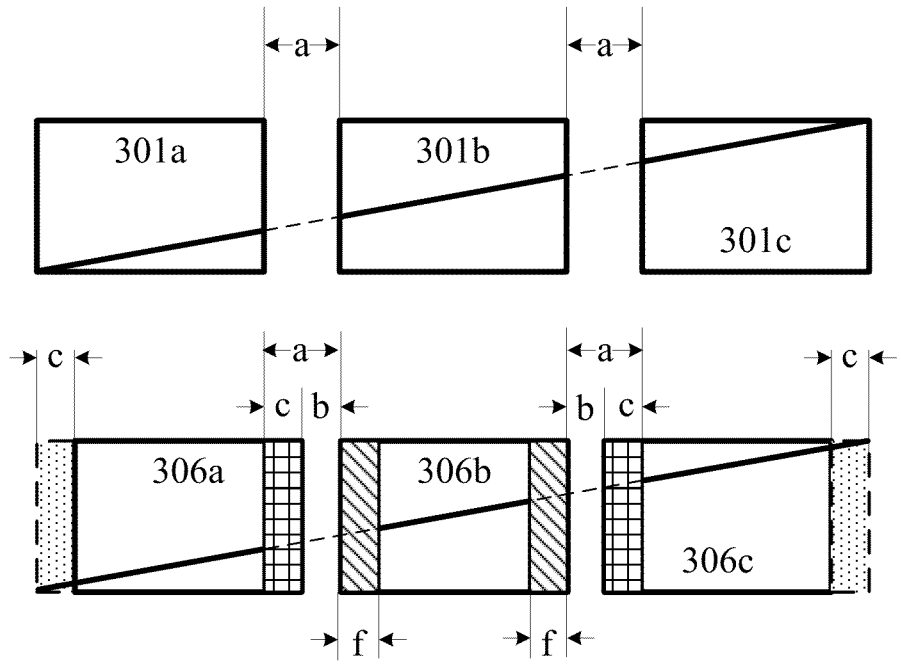
FIG. 7 is a schematic diagram of an image processing manner according to another embodiment of the present invention.

FIG. 7 is a schematic diagram of an image processing manner according to another embodiment of the present invention. The embodiment of FIG. 7 is a variation on the embodiment of FIG. 4A and is applied to the scenario shown in FIG. 1A, where a source image 301b corresponding to an intermediate screen is also pruned.

Specifically, a method for obtaining a target image 306a in FIG. 7 is the same as the method for obtaining the target image 302a in FIG. 4A, and a method for obtaining a target image 306c in FIG. 7 is the same as the method for obtaining the target image 302c in FIG. 4A. Therefore, no further details are provided herein.

As shown by the slant-shaded parts in FIG. 7, an edge that has a width of f is separately pruned from two sides of the source image 301b corresponding to the intermediate screen, and an edge that is in a preset color and has a width of f is then padded into the pruned parts, so as to obtain a target image 306b of the intermediate screen. Optionally, the preset color of the padded edge may be the same as or close to a frame color of a display device, and this can enhance visual perception of a user.

In addition, in the example of FIG. 7, the width f=|a−b|. As a first width a is greater than a second width b, f=a−b=c.

According to the embodiment of FIG. 7, distances between edges of effective display areas (non-shaded parts in FIG. 7) of the three target images 306a, 306b, and 306c and frames of display devices are the same, that is, a−b. This can enhance user experience.

Figure 8:
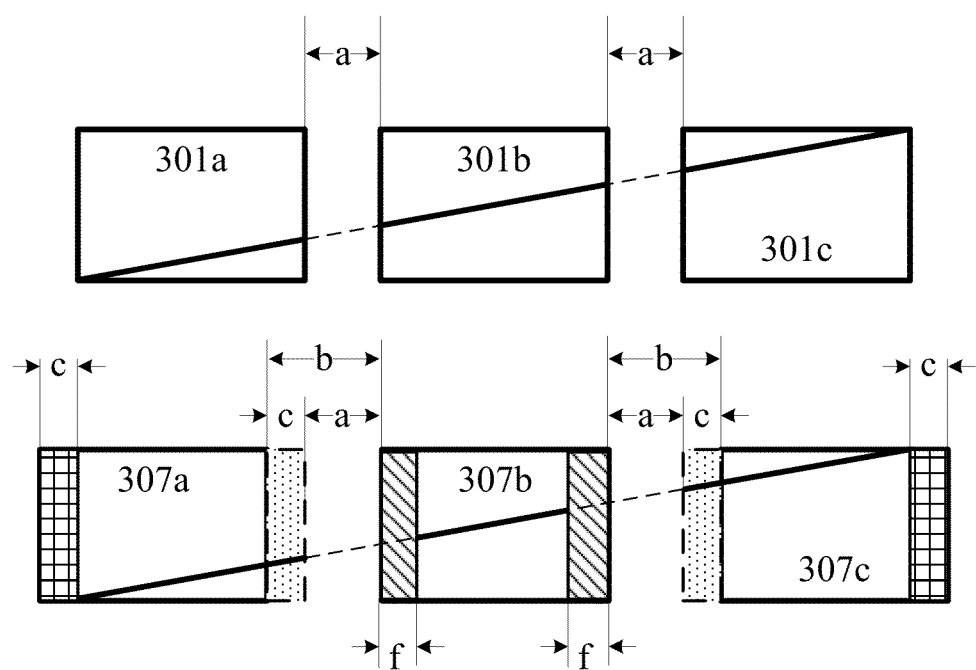
FIG. 8 is a schematic diagram of an image processing manner according to another embodiment of the present invention.

FIG. 8 is a schematic diagram of an image processing manner according to another embodiment of the present invention. The embodiment of FIG. 8 is a variation on the embodiment of FIG. 4B and is applied to the scenario shown in FIG. 1B, where a source image 301b corresponding to an intermediate screen is also pruned.

Specifically, a target image 307a in FIG. 8 is the same as the target image 303a in FIG. 4B, and a target image 307c in FIG. 8 is the same as the target image 303c in FIG. 4B. Therefore, no further details are provided herein.

As shown by the slant-shaded parts in FIG. 8, an edge that has a width of f is separately pruned from two sides of the source image 301b corresponding to the intermediate screen, and an edge that is in a preset color and has a width of f is then padded into the pruned parts, so as to obtain a target image 307b of the intermediate screen. Optionally, the preset color of the padded edge may be the same as or close to a frame color of a display device, and this can enhance visual perception of a user.

In addition, in the example of FIG. 8, the width f=|a−b|. As a first width a is less than a second width b, f=b−a=c.

According to the embodiment of FIG. 8, distances between edges of effective display areas (non-shaded parts in FIG. 7) of the target images 307a, 307b, and 307c and frames of display devices are the same, that is, b−a. This can enhance user experience.

Figure 9:
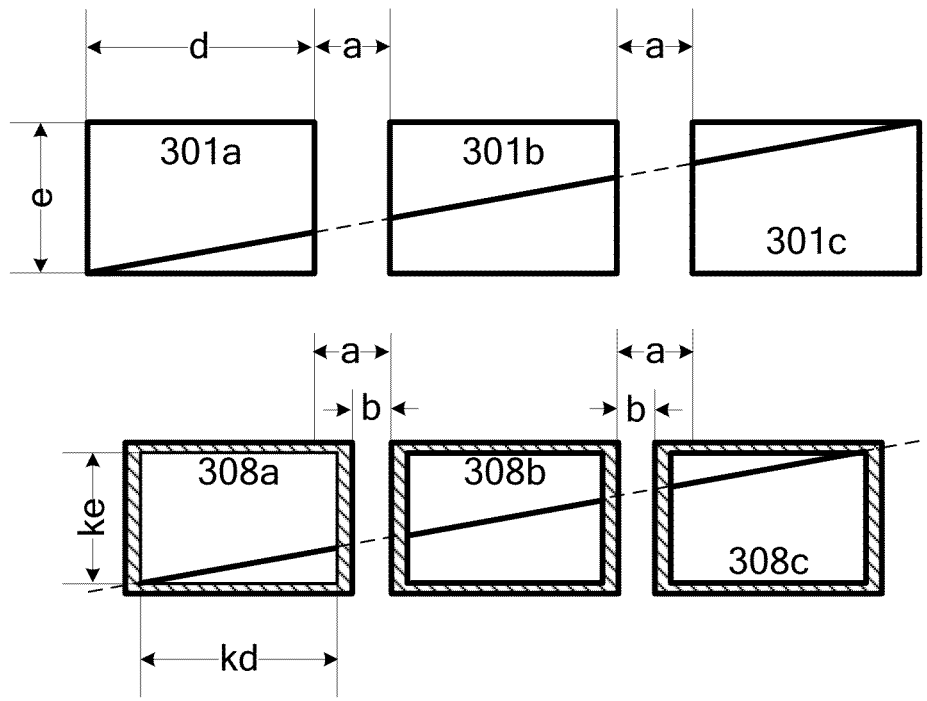
FIG. 9 is a schematic diagram of an image processing manner according to another embodiment of the present invention.

FIG. 9 is a schematic diagram of an image processing manner according to another embodiment of the present invention. The embodiment of FIG. 9 is applied to the scenario shown in FIG. 1A, where, when a source image corresponding to one or more screens among N screens is zoomed in or out to obtain a target image, the source image may be zoomed out according to a zoom factor k, k=(b+d)/(a+d), a is a first width, b is a second width, d is the width of the source image, and a>b; and an edge in a preset color is padded around the source image after zooming out, so as to obtain the target image. A position of a central point of an image may remain unchanged during the zooming.

Specifically, as shown in FIG. 9, it is assumed that source images 301a-301c are at a width of d and at a height of e, and a zoom ratio is k. Therefore, the part after zooming out is at a width of kd and at a height of ke. If it is still required that no mismatch exists in images after zooming out, that is, as shown in FIG. 9, gradients of slanting lines in source images and target images remain unchanged, equation (1) may be obtained:

$$[3kd+2b+4(1-k)d/2]/ke=(3d+2a)/e \quad (1)$$

It may be obtained according to equation (1) that:

$$k=(b+d)/(a+d) \quad (2)$$

Therefore, the source images 301a-301c need to be zoomed in or out to (b+d)/(a+d) of the original sizes. In this embodiment, the zoom factor k<1, and therefore one frame (a slant-shaded part shown in FIG. 9) needs to be padded around each image after zooming out, so as to obtain target images 308a-308c. If parts (non-shaded parts shown in the lower part of FIG. 9) of source images after zooming out are still in the middle, it can be obtained that the sum of the height of upper and lower frames is e(a−b)/(a+d), and the sum of the width of left and right frames is d(a−b)/(a+d). Generally the height of the upper and lower frames may be the same, that is, e(a−b)/2(a+d); and the width of the left and right frames is also the same, that is, d(a−b)/2(a+d).

However, the embodiment of the present invention is not limited to this. The source images after zooming out may also not in the middle of the target images. For example, parts of the source images after zooming out may be simultaneously moved by a same distance downward on the basis of the target images in FIG. 9, including being moved to lower edges of display devices; or parts of the source images after zooming out may be simultaneously moved by a same distance upward on the basis of the target images in FIG. 9, including being moved to upper edges of display devices; or parts of the source images after zooming out may be simultaneously moved by a same distance leftward on the basis of the target images in FIG. 9, including being moved to left edges of display devices; or parts of the source images after zooming out may be simultaneously moved by a same distance rightward on the basis of the target images in FIG. 9, including being moved to right edges of display devices; or the like. All these manners can still ensure that no mismatch exists in the stitched target images 308a-380c.

Optionally, the preset color of the padded edge may be the same as or close to a frame color of a display device, and this can enhance visual perception of a user.

According to the adjusting manner in FIG. 9, no information about source images is lost, and stitching of target images without a mismatch is ensured. In addition, effective display areas (non-shaded parts in FIG. 9) of the three target images are of a same size, and the user experience is identical.

Figure 10:
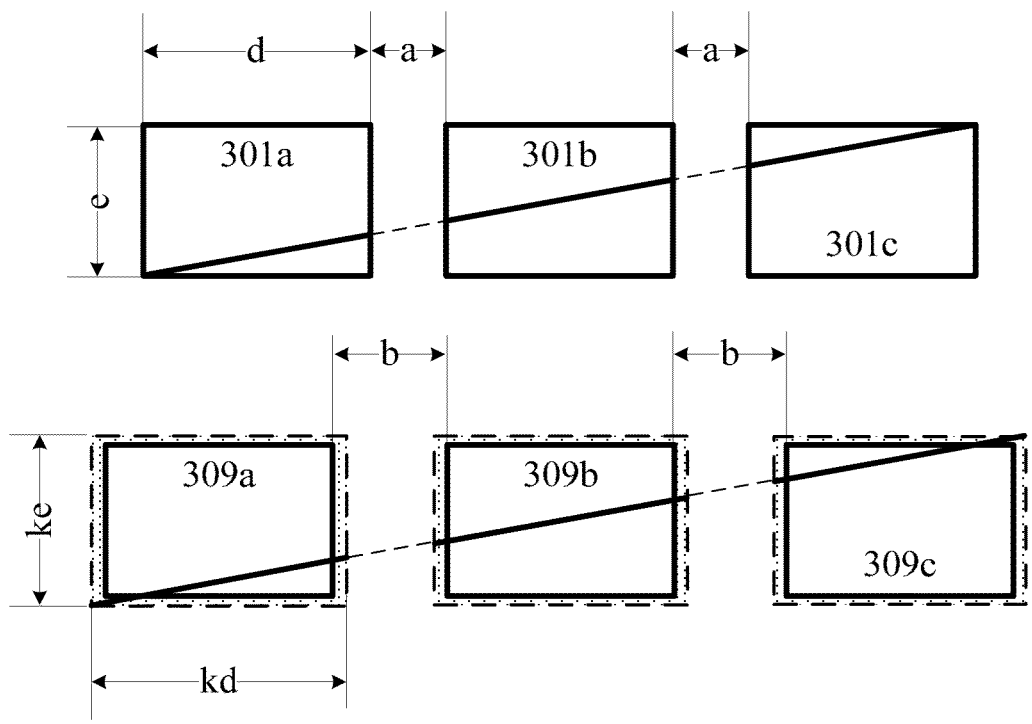
FIG. 10 is a schematic diagram of an image processing manner according to another embodiment of the present invention.

FIG. 10 is a schematic diagram of an image processing manner according to another embodiment of the present invention. The embodiment of FIG. 10 is applied to the scenario shown in FIG. 1B, where, when a source image corresponding to one or more screens among N screens is zoomed in or out and pruned to obtain a target image, the source image may be zoomed in according to a zoom factor k, k=(b+d)/(a+d), a is a first width, b is a second width, d is the width of the source image, and a<b; and an edge part is pruned from the source image after zooming in, so as to obtain the target image. A position of a central point of an image may remain unchanged during the zooming.

As the second width b is greater than the first width a, source images 301a-301c need to be zoomed in so as to ensure that no mismatch exists in stitched target images.

Specifically, as shown by the dashed boxes at the lower part of FIG. 10, the width and the height of the source images after zooming in are kd and ke respectively. In this case, edge parts, that is, dot-shaded parts in FIG. 10, need to be pruned to obtain target images 309a-309c.

According to the manner in FIG. 10, stitching of the target images 309a-309c without a mismatch can also be ensured.

According to the preceding embodiment, the width of a blind spot between source images and the width of a gap between display devices of target images may be acquired, and the source images may be adjusted according to the acquired width values so as to obtain stitched target images without a mismatch, thereby improving a sense of reality of telepresence.

Figure 11:
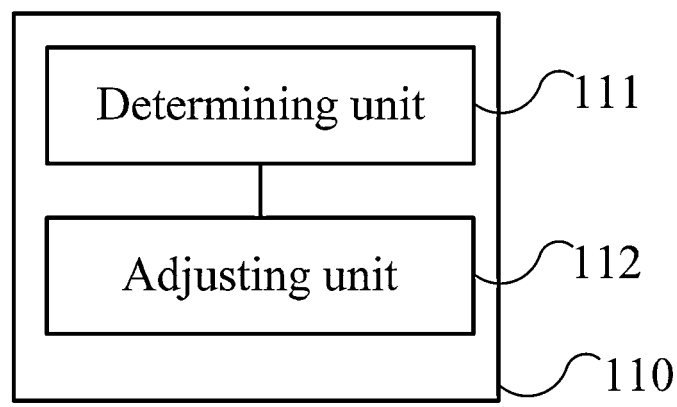
FIG. 11 is a block diagram of an image processing device according to an embodiment of the present invention.

FIG. 11 is a block diagram of an image processing device according to an embodiment of the present invention. The image processing device 110 in FIG. 11 includes a determining unit 111 and an adjusting unit 112.

The determining unit 111 determines a first width and a second width, where the second width is the width of a gap between display devices of target images on N screens, the first width is the width of a blind spot between source images corresponding to the N screens, N is an integer greater than 1, and the N screens are of a same size and are arranged side by side at a same height.

The adjusting unit 112 adjusts, when the first width is different from the second width, the source images according to the first width and the second width that are determined by the determining unit 111, so as to obtain the target images, so that no mismatch exists in the stitched target images on the N screens.

Stitching target images without a mismatch ensures that a gradient (for example, a gradient relative to a horizontal line) of a straight line determined by two actual scenario points that are separately displayed on two source images on adjacent screens is identical to a gradient of a straight line determined by the two actual scenario points that are separately displayed on two target images on adjacent screens.

According to the embodiment of the present invention, the width of a blind spot between source images and the width of a gap between display devices of target images may be acquired, and the source images may be adjusted according to the acquired width values so as to obtain stitched target images without a mismatch, thereby improving a sense of reality of telepresence.

The image processing device 110 according to the embodiment of the present invention is capable of implementing the method shown in FIG. 2 and each embodiment shown in FIG. 3-FIG. 10. To avoid repetition, no further details are provided herein.

Optionally, as an embodiment, the adjusting unit 112 may prune a source image corresponding to one or more screens among the N screens so as to obtain a target image; or zoom in or out a source image corresponding to one or more screens among the N screens so as to obtain a target image; or zoom in or out and prune a source image corresponding to one or more screens among the N screens so as to obtain a target image.

Optionally, as another embodiment, the adjusting unit 112 may take a source image corresponding to a first screen among the N screens as a target image on the first screen, or prune a source image corresponding to a first screen as a target image on the first screen; and prune a source image corresponding to an adjacent screen of the first screen as a target image on the adjacent screen.

Optionally, as another embodiment, the adjusting unit 112 may calculate a part that needs to be pruned from the source image, determine, in a color array of the source image, a pixel area corresponding to the part that needs to be pruned, and discard pixel data in the pixel area; and calculate a part that needs to be padded, determine, in the color array of the source image, a position of a pixel area corresponding to the part that needs to be padded, and add pixel data of a preset color into the pixel area corresponding to the position of the pixel area, thereby obtaining the target image corresponding to the source image.

Optionally, as another embodiment, the adjusting unit 112 may calculate a zoom factor according to the first width and the second width; and when the first width is greater than the second width, compress all pixels in a color array of the source image according to the zoom factor, calculate a part that needs to be padded, determine, in the color array of the source image, a position of a pixel area corresponding to the part that needs to be padded, and add pixel data of a preset color into the pixel area corresponding to the position of the pixel area, thereby obtaining the target image corresponding to the source image.

Optionally, as another embodiment, the adjusting unit 112 may calculate a zoom factor according to the first width and the second width; and when the first width is less than the second width, stretch all pixels in a color array of the source image according to the zoom factor, calculate a part that needs to be pruned from the source image, determine, in the color array of the source image, a pixel area corresponding to the part that needs to be pruned, and discard pixel data in the pixel area, thereby obtaining the target image corresponding to the source image.

Optionally, as another embodiment, the adjusting unit 112 may prune a part that has a width of c from a side that is in the source image corresponding to the adjacent screen and is away from the first screen, and pad an edge that is in a preset color and has a width of c into a side that is in the source image corresponding to the adjacent screen and is near the first screen, so as to obtain the target image on the adjacent screen, where a is the first width, b is the second width, a>b, and c=a−b. This can enhance user experience, which is exemplarily illustrated in the embodiment of FIG. 4A.

Optionally, as another embodiment, the adjusting unit 112 may prune a part that has a width of c from a side that is in the source image corresponding to the adjacent screen and is near the first screen, and pad an edge that is in a preset color and has a width of c into a side that is in the source image corresponding to the adjacent screen and is away from the first screen, so as to obtain the target image on the adjacent screen, where a is the first width, b is the second width, a<b, and c=b−a. This can enhance user experience, which is exemplarily illustrated in the embodiment of FIG. 4B.

Optionally, as another embodiment, the adjusting unit 112 may prune an edge that has a width of f from two sides of the source image corresponding to the first screen, and separately pad an edge that is in a preset color and has a width of f into the two sides of the source images corresponding to the first screen. This can enhance user experience, which is exemplarily illustrated in the embodiments of FIG. 5-FIG. 8. Optionally, f=|a−b|/2 or f=|a−b|.

Optionally, as another embodiment, the adjusting unit 112 may zoom out the source image according to a zoom factor k, where k=(b+d)/(a+d), a is the first width, b is the second width, d is the width of the source image, and a>b, and pad an edge in the preset color around the source image after zooming out, so as to obtain the target image. A position of a central point of an image may remain unchanged during the zooming. This can enhance user experience, which is exemplarily illustrated in the embodiment of FIG. 9.

Optionally, as another embodiment, the adjusting unit 112 may zoom in the source image according to a zoom factor k, where k=(b+d)/(a+d), a is the first width, b is the second width, d is the width of the source image, and a<b; and prune an edge part from the source image after zooming in, so as to obtain the target image. A position of a central point of an image may remain unchanged during the zooming. This can enhance user experience, which is exemplarily illustrated in the embodiment of FIG. 10.

Optionally, as another embodiment, the preceding preset color may be a frame color of a display device of a target image or be close to a frame color of a display device of a target image.

Optionally, as another embodiment, the determining unit 111 may further determine, according to a presetting or a user instruction, a manner for adjusting a source image, so that the adjusting unit 112 may adjust the source image according to the determined adjusting manner. For example, multiple adjusting manners may be provided for the user to select, and one of the adjusting manners is selected according to the preference of the user.

Optionally, as another embodiment, the adjusting unit 112 may further preprocess original images corresponding to the N screens so as to obtain source images that correspond to the N screens and have the same dimensions as target images, where dimensions of the original images are the same as or different from those of the target images.

Optionally, as another embodiment, if the dimensions of the original images are the same as those of the target images, the adjusting unit 112 may take the original images as the source images; and if the dimensions of the original images are different from those of the target images, the adjusting unit 112 may separately zoom in or out, prune, and/or pad the original images corresponding to the N screens so as to obtain corresponding source images.

Optionally, as another embodiment, if aspect ratios of the original images are the same as those of the target images and the width w of the original images is different from the width d of the target images, the adjusting unit 112 may proportionally zoom in or out, according to a zoom factor m, the original images corresponding to the N screens so as to obtain corresponding source images, where m=d/w.

In this case, the determining unit 111 may determine that the first width a=n×A, where n=m, and A is the width of a blind spot between the original images corresponding to the N screens, exemplarily as illustrated in the embodiment of FIG. 3A.

Optionally, as another embodiment, if aspect ratios of the original images are different from those of the target images, the adjusting unit 112 may proportionally zoom in or out, according to a zoom factor m1, the original images corresponding to the N screens so as to obtain corresponding intermediate images, where m1=e/h, e is the height of the target images, and h is the height of the original images; and separately zoom in or out, according to a zoom factor m2, the width of the intermediate images corresponding to the N screens so as to obtain corresponding source images, where m2=dh/ew, d is the width of the target images, and w is the width of the original images.

In this case, the determining unit 111 may determine that the first width a=n×A, where n=d/w, and A is the width of a blind spot between the original images corresponding to the N screens.

Optionally, as another embodiment, if aspect ratios of the original images are different from those of the target images, the adjusting unit 112 may proportionally zoom in or out, according to a zoom factor m1, the original images corresponding to the N screens so as to obtain corresponding intermediate images, where m1=e/h, e is the height of the target images, and h is the height of the original images; and prune or pad an edge that has a total width of |d−(ew/h)| from or into one or two sides of the intermediate images corresponding to the N screens so as to obtain corresponding source images, where d is the width of the target images, w is the width of the original images, and || is a calculation of taking an absolute value.

In this case, the determining unit 111 may determine that the first width a=n×A, where n=(2Ae+ew−dh)/2Ah, and A is the width of a blind spot between the original images corresponding to the N screens, exemplarily as illustrated in the embodiments of FIG. 3B and FIG. 3C.

According to the embodiment of the present invention, the image processing device may acquire the width of a blind spot between source images and the width of a gap between display devices of target images, and adjust the source images according to the acquired width values so as to obtain stitched target images without a mismatch, thereby improving a sense of reality of telepresence. Even if the dimensions of original images are different from those of the target images, the original images may also be preprocessed to obtain the source images, and then the source images are adjusted to obtain the stitched target images without a mismatch.

Figure 12:
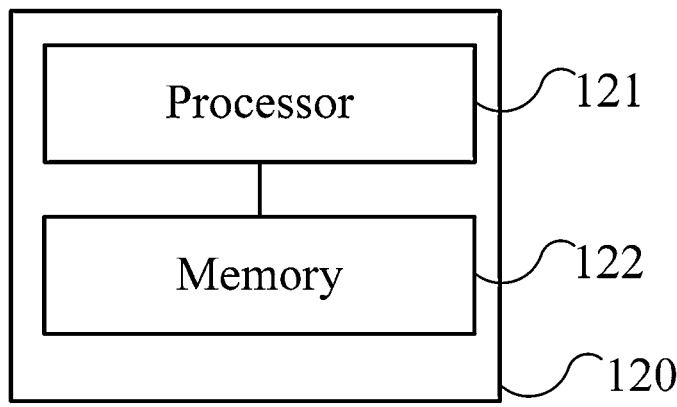
FIG. 12 is a block diagram of an image processing device according to another embodiment of the present invention.

FIG. 12 is a schematic block diagram of an image processing device according to another embodiment of the present invention. The image processing device 120 in FIG. 12 includes a processor 121 and a memory 122.

The memory 122 stores instructions for the processor 121 to execute the following operations: determining a first width and a second width, where the second width is the width of a gap between display devices of target images on N screens, the first width is the width of a blind spot between source images corresponding to the N screens, N is an integer greater than 1, and the N screens are of a same size and are arranged side by side at a same height; and when the first width is different from the second width, adjusting the source images according to the determined first width and second width so as to obtain the target images, so that no mismatch exists in the stitched target images on the N screens.

Stitching target images without a mismatch ensures that a gradient (for example, a gradient relative to a horizontal line) of a straight line determined by two actual scenario points that are separately displayed on two source images on adjacent screens is identical to a gradient of a straight line determined by the two actual scenario points that are separately displayed on two target images on adjacent screens.

According to the embodiment of the present invention, the width of a blind spot between source images and the width of a gap between display devices of target images are acquired, and the source images are adjusted according to the acquired width values so as to obtain stitched target images without a mismatch, thereby improving a sense of reality of telepresence.

The image processing device 120 according to the embodiment of the present invention is capable of implementing the method shown in FIG. 2 and each embodiment shown in FIG. 3-FIG. 10. To avoid repetition, no further details are provided herein.

The processor 121 and the memory 122 are connected through a bus system. Except for a data bus, the bus system may further include a power bus, a control bus, a status signal bus, and the like. The embodiment of the present invention does not set a limitation to a specific form of the bus.

The memory 122 stores instructions for the processor 121 to execute each operation and data required for executing each operation. The processor 121 may be a CPU (Central Processing Unit, central processing unit), and may also be a GPU (Graphic Processing Unit, graphics processing unit), or may be in other forms, such as a general processor, a digital signal processor (DSP), an application-specific integrated circuit (ASIC), a field programmable gate array (FPGA) or another programmable logic device, a discrete-gate or transistor logic device, and a discrete hardware component, and is capable of implementing or executing each method, step, and logical block diagram that are disclosed in the embodiments of the present invention. The general processor may be a microprocessor, or the processor may also be any common processor or the like. The memory 122 may include a read-only memory and a random access memory, and provide an instruction and data for the processor 121. A part of the memory 122 may also include a non-volatile random access memory (NVRAM).

In addition, in the implementation process, each step in the preceding methods may be implemented by an integrated logic circuit of hardware or through instruction control in a software form, where the hardware and the software are on the processor 121. The combination of the processor 121 and the steps in the methods disclosed in the embodiments of the present invention may directly be embodied as being implemented by a hardware decoding processor, or by a combination of hardware and software modules on a decoding processor. A software module may be located on a mature storage medium in the field, such as a random access memory, a flash memory, a read-only memory, a programmable read-only memory or an electrically erasable and programmable memory, and a register. The storage medium is located on the memory 122, and the processor 121 reads information on the memory 122 and implements the steps in the preceding methods by using its hardware.

Optionally, as an embodiment, the first width and the second width may be extracted by the image processing device 120 according to a system specification parameter (for example, a specification parameter of a display device) and may also be obtained according to an input of a user. The embodiment of the present invention does not set a limitation to this.

Optionally, as an embodiment, a manner for adjusting the source images to obtain the target images includes but is not limited to pruning and/or zooming in or out a source image corresponding to one or more screens among the N screens.

Optionally, as another embodiment, when pruning a source image corresponding to one or more screens among the N screens so as to obtain a target image, the processor 121 may take a source image corresponding to a first screen among the N screens as a target image on the first screen, or prune a source image corresponding to a first screen as a target image on the first screen; and prune a source image corresponding to an adjacent screen of the first screen as a target image on the adjacent screen.

Optionally, as another embodiment, when pruning a source image corresponding to an adjacent screen of the first screen as a target image on the adjacent screen, the processor 121 may prune a part that has a width of c from a side that is in the source image corresponding to the adjacent screen and is away from the first screen, and pad an edge that is in a preset color and has a width of c into a side that is in the source image corresponding to the adjacent screen and is near the first screen, so as to obtain the target image on the adjacent screen, where a is the first width, b is the second width, a>b, and c=a−b.

Optionally, as another embodiment, when pruning a source image corresponding to an adjacent screen of the first screen as a target image on the adjacent screen, the processor 121 may prune a part that has a width of c from a side that is in the source image corresponding to the adjacent screen and is near the first screen, and pad an edge that is in a preset color and has a width of c into a side that is in the source image corresponding to the adjacent screen and is away from the first screen, so as to obtain the target image on the adjacent screen, where a is the first width, b is the second width, a<b, and c=b−a.

Optionally, as another embodiment, when pruning a source image corresponding to a first screen as a target image on the first screen, the processor 121 may prune an edge that has a width of f from two sides of the source image corresponding to the first screen, and separately pad an edge that is in a preset color and has a width of f into the two sides of the source image corresponding to the first screen, where $f<=|a-b|$ and optionally, $f=|a-b|/2$ or $f=|a-b|$.

Optionally, as another embodiment, when zooming in or out a source image corresponding to one or more screens among the N screens so as to obtain a target image, the processor 121 may zoom out the source image according to a zoom factor k, and $k=(b+d)/(a+d)$, where a is the first width, b is the second width, d is the width of the source image, and a>b; and pad an edge in a preset color around the source image after zooming out, so as to obtain the target image. A position of a central point of an image may remain unchanged during the zooming.

Optionally, as another embodiment, when zooming in or out and pruning a source image corresponding to one or more screens among the N screens so as to obtain a target image, the processor 121 may zoom in the source image according to a zoom factor k, and k=(b+d)/(a+d), where a is the first width, b is the second width, d is the width of the source image, and a<b; and prune an edge part from the source image after zooming in, so as to obtain the target image. A position of a central point of an image may remain unchanged during the zooming.

Optionally, as another embodiment, the preceding preset color may be a frame color of a display device of a target image or be close to a frame color of a display device of a target image.

Optionally, as another embodiment, the processor 121 may further determine, according to a presetting or through a user instruction, a manner for adjusting the source image. For example, multiple adjusting manners may be provided for the user to select, and one of the adjusting manners is selected according to the preference of the user.

Optionally, as another embodiment, the processor 121 may further preprocess original images corresponding to the N screens so as to obtain source images that correspond to the N screens and have the same dimensions as target images, where dimensions of the original images is the same as or different from those of the target images.

Optionally, as another embodiment, if the dimensions of the original images are the same as those of the target images, the processor 121 may take the original images as the source images; and if the dimensions of the original images are different from those of the target images, the processor 121 may separately zoom in or out, prune, and/or pad the original images corresponding to the N screens so as to obtain corresponding source images.

Optionally, as another embodiment, if aspect ratios of the original images are the same as those of the target images and the width w of the original images is different from the width d of the target images, the processor 121 may proportionally zoom in or out, according to a zoom factor m, the original images corresponding to the N screens, so as to obtain corresponding source images, where m=d/w.

In this case, the processor 121 may determine that the first width a=n×A, where n=m, and A is the width of a blind spot between the original images corresponding to the N screens, exemplarily as illustrated in the embodiment of FIG. 3A.

Optionally, as another embodiment, if aspect ratios of the original images are different from those of the target images, the processor 121 may: proportionally zoom in or out, according to a zoom factor m1, the original images corresponding to the N screens so as to obtain corresponding intermediate images, where m1=e/h, e is the height of the target images, and h is the height of the original images; and separately zoom in or out, according to a zoom factor m2, the width of the intermediate images corresponding to the N screens so as to obtain corresponding source images, where m2=dh/ew, d is the width of the target images, and w is the width of the original images.

In this case, the processor 121 may determine that the first width a=n×A, where n=d/w, and A is the width of a blind spot between the original images corresponding to the N screens.

Optionally, as another embodiment, if aspect ratios of the original images are different from those of the target images, the processor 121 may: proportionally zoom in or out, according to a zoom factor m1, the original images corresponding to the N screens, so as to obtain corresponding intermediate images, where m1=e/h, e is the height of the target images, and h is the height of the original images; and prune or pad an edge that has a total width of |d−(ew/h)| from or into one or two sides of the intermediate images corresponding to the N screens, so as to obtain corresponding source images, where d is the width of the target images, w is the width of the original images, and || is a calculation of taking an absolute value.

In this case, the processor 121 may determine that the first width a=n×A, where n=(2Ae+ew−dh)/2Ah, and A is the width of a blind spot between the original images corresponding to the N screens, exemplarily as illustrated in the embodiments of FIG. 3B and FIG. 3C.

According to the embodiment of the present invention, the width of a blind spot between source images and the width of a gap between display devices of target images may be acquired, and the source images may be adjusted according to the acquired width values so as to obtain stitched target images without a mismatch, thereby improving a sense of reality of telepresence. Even if the dimensions of original images are different from those of the target images, the original images may also be preprocessed to obtain the source images, and then the source images are adjusted to obtain the stitched target images without a mismatch.

In addition, embodiments of the present invention do not set a limitation to positions of the image processing devices 110 and 120. The image processing devices 110 and 120 may be located at a shooting end of a remote conference site, may also be located at a target end for displaying a target image, or may be located between a shooting end and a target end. The image processing devices 110 and 120 each may be an independent device and may also act as a part of a device.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each specific application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or part of the technical solutions may be implemented in a form of a software product. The computer software product is stored in a storage medium, and includes several instructions for instructing a computer device (which may be a personal computer, a server, or a network device or the like) to perform all or a part of the steps of the methods described in the embodiments of the present invention. The foregoing storage medium includes: any medium that can store program codes, such as a USB flash disk, a removable hard disk, a read-only memory (ROM, Read-Only Memory), a random access memory (RAM, Random Access Memory), a magnetic disk, or an optical disk.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An image processing method for providing video conferencing, comprising:
   determining, by a processor, a first width corresponding to width of one or more blind spots between N source images and determining a second width corresponding to width of one or more gaps between N target display devices, wherein N is an integer greater than 1 and the N target display devices have screens that are of a same size and are arranged side by side at a same height, and wherein the first width is different from the second width; and
   adjusting, by the processor, the source images according based on the determined first width and second width so as to obtain target images to be displayed on the N target display devices such that no mismatch exists in the target images displayed on the N target display devices;
   wherein the adjusting comprises pruning and padding a source image so as to obtain a corresponding target image;
   wherein the pruning and padding comprises:
      calculating a part that needs to be pruned from the source image;
      determining in a color array of the source image a pixel area corresponding to the part that needs to be pruned;
      discarding pixel data in the pixel area;
      calculating a part that needs to be padded;
      determining in the color array of the source image a position of a pixel area corresponding to the part that needs to be padded; and
      adding pixel data of a preset color into the pixel area corresponding to the position of the pixel area thereby obtaining the target image corresponding to the source image.

2. The method according to claim 1, wherein the preset color is a frame color of a display device of the target image.

3. The method according to claim 1, wherein the pruning and padding comprises:
   taking a first source image as a target image on a first target display device or pruning and padding the first source image as a target image on the first target display device; and
   pruning and padding a second source image adjacent to the first source image to obtain a target image on a second target display device adjacent to the first target display device.

4. The method according to claim 3, wherein pruning and padding the second source image comprises:
   when the first width is greater than the second width, pruning a part that has a width of c from a side that is in the second source image away from the first source image, and padding an edge that is in a preset color and has a width of c into a side that is in the second source image near the first source image, so as to obtain the target image for the second target display device, wherein $c=a-b$, a is the first width, and b is the second width.

5. The method according to claim 3, wherein the pruning and padding the second source image comprises:
   when the first width is less than the second width, pruning a part that has a width of c from a side that is in the second source image near the first source image, and padding an edge that is in a preset color and has a width of c into a side that is in the second source image away from the first source image, so as to obtain the target image for the second target display device, wherein $c=b-a$, a is the first width, and b is the second width.

6. The method according to claim 3, wherein the pruning and padding the first source image comprises:
   pruning an edge that has a width of f from two sides of the first source image, and separately padding an edge that is in a preset color and has a width of f into the two sides of the first source image, wherein $f<=|a-b|$, a is the first width, and b is the second width.

7. The method according to claim 6, wherein $f=|a-b|/2$ or $f=|a-b|$.

8. An image processing method for providing video conferencing, comprising:
   determining a first width corresponding to width of one or more blind spots between N source images and determining a second width corresponding to width of one or more gaps between N target display devices wherein N is an integer greater than 1 and the N target display devices have screens that are of a same size and are arranged side by side at a same height, and wherein the first width is different from the second width; and
   adjusting the source images according based on the determined first width and second width so as to obtain target images to be displayed on the N target display devices such that no mismatch exists in the tar et images displayed on the N tar et display devices;
   wherein the adjusting comprises zooming out and padding a source image so as to obtain a corresponding target image;
   wherein the zooming out and padding comprises:
      calculating a zoom factor according to the first width and the second width; and
      when the first width is greater than the second width compressing all pixels in a color array of the source image according to the zoom factor, calculating a part that needs to be padded determining in the color array of the source image a of a pixel area corresponding to the part that needs to be padded and adding pixel data of a preset color into the pixel area corresponding to the position of the pixel area, thereby obtaining the target image corresponding to the source image.

9. The method according to claim 8, wherein the zooming out and padding comprises:
when the first width is greater than the second width, zooming out the source image according to a zoom factor k, wherein k=(b+d)/(a+d), a is the first width, b is the second width, and d is the width of the source image; and
padding an edge in the preset color around the source image after zooming out, so as to obtain the target image corresponding to the source image.

10. An image processing method for providing video conferencing, comprising:
determining a first width corresponding to width of one or more blind spots between N source images and determining a second width corresponding to width of one or more gaps between N target display devices wherein N is an integer greater than 1 and the N target display devices have screens that are of a same size and are arranged side by side at a same height, and wherein the first width is different from the second width; and
adjusting the source images according based on the determined first width and second width so as to obtain target images to be displayed on the N target display devices such that no mismatch exists in the tar et images displayed on the N target display devices;
wherein the adjusting comprises zooming in and pruning a source image so as to obtain a corresponding target image;
wherein the zooming and pruning comprises:
calculating a zoom factor according to the first width and the second width; and
when the first width is less than the second width stretching all pixels in a color array of the source image according to the zoom factor, calculating a part that needs to be pruned from the source image, determining in the color array of the source image a pixel area corresponding to the part that needs to be pruned, and discarding pixel data in the pixel area, thereby obtaining the target image corresponding to the source image.

11. The method according to claim 10, wherein the zooming in and pruning comprises:
when the first width is less than the second width, zooming in the source image according to a zoom factor k, wherein k=(b+d)/(a+d), a is the first width, b is the second width, and d is the width of the source image; and
pruning an edge part from the source image after zooming in, so as to obtain the target image corresponding to the source image.

12. The method according to claim 1, further comprising:
preprocessing original images so as to obtain the N source images, the N source images having the same dimensions as target images to be displayed on the N target display devices, and wherein dimensions of the original images are different from the dimensions of the target images.

13. The method according to claim 12, wherein the preprocessing comprises:
separately zooming in or out, pruning, and/or padding the original images as to obtain corresponding source images.

14. The method according to claim 13, wherein the separately zooming in or out, pruning, and/or padding comprises:
if aspect ratios of the original images are the same as aspect ratios of the target images and the width w of the original images is different from the width d of the target images, proportionally zooming in or out, according to a zoom factor m, the original images so as to obtain the corresponding source images, wherein m=d/w.

15. The method according to claim 14, wherein the first width a is determined according to a=n×A, wherein n=m, and A is the width of one or more blind spots between the original images.

16. The method according to claim 13, wherein the separately zooming in or out, pruning, and/or padding comprises:
if aspect ratios of the original images are different from aspect ratios of the target images, proportionally zooming in or out, according to a zoom factor m1, the original images corresponding so as to obtain corresponding intermediate images, wherein m1=e/h, e is the height of the target images, and h is the height of the original images; and
pruning or padding an edge that has a total width of |d−(ew/h)| from or into one or two sides of the intermediate images, so as to obtain the corresponding source images, wherein d is the width of the target images and w is the width of the original images.

17. The method according to claim 16, wherein the first width a is determined according to a=n×A, wherein n=(2Ae+ew−dh)/2Ah, and A is the width of one or more blind spots between the original images.

18. An image processing device, comprising a non-transitory processor-readable medium having processor-executable instructions stored thereon for providing video conferencing, the processor-executable instructions, when executed by a processor, causing the following steps to be performed:
determining a first width corresponding to width of one or more blind spots between N source images and determining a second width corresponding to width of one or more gaps between N target display devices, wherein N is an integer greater than 1 and the N target display devices have screens that are of a same size and are arranged side by side at a same height, and wherein the first width is different from the second width; and
adjusting the source images according based on the determined first width and second width so as to obtain target images to be displayed on the N target display devices such that no mismatch exists in the target images displayed on the N target display devices:,
wherein the adjusting comprises pruning and padding a source image so as to obtain a corresponding target image;
wherein the pruning and padding comprises:
calculating a part that needs to be pruned from the source image;
determining in a color array of the source image a pixel area corresponding to the part that needs to be pruned;
discarding pixel data in the pixel area;
calculating a part that needs to be padded;
determining in the color array of the source image, a position of a pixel area corresponding to the part that needs to be padded; and
adding pixel data of a preset color into the pixel area corresponding to the position of the pixel area thereby obtaining the target image corresponding to the source image.

19. The device according to claim 18, wherein the processor-executable instructions, when executed by a processor, further cause the following step to be performed:

preprocessing original images so as to obtain the N source images, the N source images having the same dimensions as target images to be displayed on the N target display devices, and wherein dimensions of the original images are different from the dimensions of the target images.

20. The device according to claim 19, wherein the preprocessing comprises:
separately zooming in or out, pruning, and/or padding the original images as to obtain corresponding source images.

21. The device according to claim 20, wherein the separately zooming in or out, pruning, and/or padding comprises:
if aspect ratios of the original images are the same as aspect ratios of the target images and the width w of the original images is different from the width d of the target images, proportionally zooming in or out, according to a zoom factor m, the original images so as to obtain the corresponding source images, wherein m=d/w.

22. The device according to claim 21, wherein the first width a is determined according to a=n×A, wherein n=m, and A is the width of one or more blind spots between the original images.

23. The device according to claim 20, wherein the separately zooming in or out, pruning, and/or padding comprises:
if aspect ratios of the original images are different from aspect ratios of the target images, proportionally zooming in or out, according to a zoom factor m1, the original images corresponding so as to obtain corresponding intermediate images, wherein m1=e/h, e is the height of the target images, and h is the height of the original images; and
pruning or padding an edge that has a total width of |d−(ew/h)| from or into one or two sides of the intermediate images, so as to obtain the corresponding source images, wherein d is the width of the target images and w is the width of the original images.

24. The device according to claim 23, wherein the first width a is determined according to a=n×A, wherein n=(2Ae+ew−dh)/2Ah, and A is the width of one or more blind spots between the original images.

25. The method according to claim 8, further comprising:
preprocessing original images so as to obtain the N source images, the N source images having the same dimensions as target images to be displayed on the N target display devices, and wherein dimensions of the original images are different from the dimensions of the target images.

26. The method according to claim 25, wherein the preprocessing comprises:
separately zooming in or out, pruning, and/or padding the original images as to obtain corresponding source images.

27. The method according to claim 26, wherein the separately zooming in or out, pruning, and/or padding comprises:
if aspect ratios of the original images are the same as aspect ratios of the target images and the width w of the original images is different from the width d of the target images, proportionally zooming in or out, according to a zoom factor m, the original images so as to obtain the corresponding source images, wherein m=d/w.

28. The method according to claim 10, further comprising:
preprocessing original images so as to obtain the N source images, the N source images having the same dimensions as target images to be displayed on the N target display devices, and wherein dimensions of the original images are different from the dimensions of the target images.

29. The method according to claim 28, wherein the preprocessing comprises:
separately zooming in or out, pruning, and/or padding the original images as to obtain corresponding source images.

30. The method according to claim 29, wherein the separately zooming in or out, pruning, and/or padding comprises:
if aspect ratios of the original images are the same as aspect ratios of the target images and the width w of the original images is different from the width d of the target images, proportionally zooming in or out, according to a zoom factor m, the original images so as to obtain the corresponding source images, wherein m=d/w.

* * * * *

UNITED STATES PATENT AND TRADEMARK OFFICE
CERTIFICATE OF CORRECTION

PATENT NO. : 8,866,871 B2  Page 1 of 2
APPLICATION NO. : 14/196877
DATED : October 21, 2014
INVENTOR(S) : Xiao et al.

It is certified that error appears in the above-identified patent and that said Letters Patent is hereby corrected as shown below:

On the Title Page, item [71], "Guangdong (CN)" should read -- Shenzhen (CN) --.

In the Claims

Column 31
Line 57, Claim 1, after "determining" insert -- , --.
Line 57, Claim 1, after "image" insert -- , --.
Line 61, Claim 1, after "determining" insert -- , --.
Line 61, Claim 1, after "image" insert -- , --.
Line 65, Claim 1, after "area" insert -- , --.

Column 32
Line 37, Claim 6, "off" should read -- of f --.
Line 47, Claim 8, after "devices" insert -- , --.
Line 55, Claim 8, "tar et" should read -- target --.
Line 56, Claim 8, "tar et" should read -- target --.
Line 63, Claim 8, after "width" insert -- , --.
Line 66, Claim 8, after "padded" insert -- , --.
Line 66, Claim 8, after "determining" insert -- , --.
Line 67, Claim 8, after "image" insert -- , --.

Column 33
Line 1, Claim 8, after "padded" insert -- , --.
Line 28, Claim 10, "tar et" should read -- target --.
Line 36, Claim 10, after "width" insert -- , --.
Line 40, Claim 10, "ing in" should read -- ing, in --.
Line 40, Claim 10, after "image" insert -- , --.

Signed and Sealed this
Twenty-third Day of June, 2015

Michelle K. Lee
*Director of the United States Patent and Trademark Office*

Column 34

Line 54, Claim 18, after "determining" insert -- , --.
Line 54, Claim 18, after "image" insert -- , --.
Line 58, Claim 18, after "determining" insert -- , --.
Line 62, Claim 18, after "area" insert -- , --.